United States Patent
Campagna et al.

(10) Patent No.: US 10,243,939 B2
(45) Date of Patent: Mar. 26, 2019

(54) KEY DISTRIBUTION IN A DISTRIBUTED COMPUTING ENVIRONMENT

(71) Applicant: Amazon Technologies, Inc., Seattle, WA (US)

(72) Inventors: Matthew John Campagna, Bainbridge Island, WA (US); Gregory Alan Rubin, Seattle, WA (US); Nicholas Alexander Allen, Kirkland, WA (US); Andrew Kyle Driggs, Seattle, WA (US); Eric Jason Brandwine, Haymarket, VA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/390,214

(22) Filed: Dec. 23, 2016

(65) Prior Publication Data

US 2018/0183774 A1 Jun. 28, 2018

(51) Int. Cl.
*H04L 29/06* (2006.01)
*H04L 9/32* (2006.01)
*H04L 9/08* (2006.01)

(52) U.S. Cl.
CPC .......... *H04L 63/067* (2013.01); *H04L 9/0819* (2013.01); *H04L 9/0869* (2013.01); *H04L 9/0891* (2013.01); *H04L 9/3236* (2013.01); *H04L 9/3247* (2013.01); *H04L 63/0884* (2013.01)

(58) Field of Classification Search
CPC ....................................................... H04L 63/67
USPC ........................................................ 713/176
See application file for complete search history.

(56) References Cited

U.S. PATENT DOCUMENTS

| 6,701,434 B1 | 3/2004 | Rohatgi |
| 9,049,185 B1 | 6/2015 | Papadopoulos et al. |
| 2002/0107814 A1 | 8/2002 | Micali |
| 2004/0107341 A1 | 6/2004 | Hall et al. |
| 2005/0036615 A1* | 2/2005 | Jakobsson ............. H04L 9/3234 380/255 |

(Continued)

OTHER PUBLICATIONS

Bare, "Attestation and Trusted Computing," University of Washington, Washington, Mar. 2006.

(Continued)

*Primary Examiner* — Jacob Lipman
(74) *Attorney, Agent, or Firm* — Davis Wright Tremaine LLP

(57) ABSTRACT

A key distribution service operated by a signature authority distributes one-time-use cryptographic keys to one or more delegates that generate digital signatures on behalf of the signature authority. The key distribution service uses a root seed value to generate subordinate seeds. The subordinate seeds are used to generate a set of cryptographic keys. Hashes are generated for each key, and the hashes are arranged into a Merkle tree with a root hash controlled by the signature authority. In response to a request from a delegate, the signature authority provides a subordinate seed to the delegate. The delegate uses the subordinate seed to generate one or more cryptographic keys. The cryptographic keys are used to generate digital signatures which are verifiable up to the root hash of the Merkle tree. Additional subordinate seeds may be distributed to entities by the signature authority when appropriate.

20 Claims, 17 Drawing Sheets

(56) References Cited

U.S. PATENT DOCUMENTS

| | | | |
|---|---|---|---|
| 2009/0070361 | A1 | 3/2009 | Haber et al. |
| 2013/0083926 | A1 | 4/2013 | Hughes et al. |
| 2015/0295720 | A1 | 10/2015 | Buldas et al. |
| 2016/0253523 | A1 | 9/2016 | Kroonmaa et al. |
| 2017/0289151 | A1 | 10/2017 | Shanahan et al. |
| 2017/0357496 | A1* | 12/2017 | Smith ................. G06F 8/65 |

OTHER PUBLICATIONS

Becker, "Merkle Signature Schemes, Merkle Trees and Their Cryptanalysis," Technical Report [Seminararbeit], Ruhr-University Bochum, Jul. 18, 2008, 28 pages.
Buchmann et al., "On the Security of the Winternitz One-Time Signature Scheme: Full Version," International Conference on Cryptology in Africa, Jul. 5, 2011, 17 pages.
Campagna et al., "Quantum Safe Cryptography V1.0.0 (Oct. 2014): Quantum Safe Cryptography and Security; An Introduction, benefits, enablers and challenges," European Telecommunications Standards Institute White Paper, ISBN 979-10-92620-03-0, Oct. 1, 2014, 49 pages.
Cooper, et al., "Internet X.509 Public Key Infrastructure Certificate and Certificate Revocation List (CRL) Profile," Request for Comments: 5280, Standards Track, 141 pages.
Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.
McGrew et al., "Hash-Based Signatures: draft-mcgrew-hash-sigs-02," Crypto Forum Research Group Internet-Draft, Jul. 4, 2014, 52 pages.
McGrew et al., "Hash-Based Signatures: draft-mcgrew-hash-sigs-06," Crypto Forum Research Group Internet-Draft, Mar. 5, 2017, 25 pages.
Menezes et al., Handbook of Applied Cryptography, CRC Press, 1997, ISBN 0-8493-8523-7, 794 pages.
Santesson et al., "X.509 Internet Public Key Infrastructure Online Certificate Status Protocol—OCSP," Request for Comments 6960, Standards Track, Jun. 2013, 41 pages.
Wikipedia, "Lamport Signature," page last modified Oct. 13, 2016, retrieved Dec. 16, 2016, https://en.wikipedia.org/wiki/Lamport_signature, 5 pages.
Wikipedia, "Merkle Signature Scheme," page last modified Sep. 23, 2016, retrieved Dec. 16, 2016, https://en.wikipedia.org/wiki/Merkle_signature_scheme, 3 pages.
Wikipedia, "Merkle Tree," retreived Jul. 12, 2012, from https://en.wikipedia.org/windex.php?title=Merkle_tree&oldid=499247620, 4 pages.
U.S. Appl. No. 15/390,176, filed Dec. 23, 2016.
U.S. Appl. No. 15/389,686, filed Dec. 23, 2016.
U.S. Appl. No. 15/390,205, filed Dec. 23, 2016.
U.S. Appl. No. 15/389,771, filed Dec. 23, 2016.
Elwailly et al., "QuasiModo: Efficient Certificate Validation and Revocation," International Workshop on Public Key Cryptography, Feb. 26, 2004, 14 pages.
International Search Report and Written Opinion dated Mar. 26, 2018, International Patent Application No. PCT/US2017/067978, filed Dec. 21, 2017, 14 pages.
International Search Report and Written Opinion dated Mar. 26, 2018, International Patent Application No. PCT/US2017/067994, filed Dec. 21, 2017, 13 pages.
Micali, "Efficient Certificate Revocation," Technical Report TM-542b, MIT Laboratory for Computer Science, Mar. 22, 1996, 10 pages.

* cited by examiner

KEY DISTRIBUTION IN A DISTRIBUTED COMPUTING ENVIRONMENT

CROSS-REFERENCE TO RELATED APPLICATIONS

This application incorporates by reference for all purposes the full disclosures of co-pending U.S. patent application Ser. No. 15/390,176, filed concurrently herewith, entitled "SIGNATURE DELEGATION," co-pending U.S. patent application Ser. No. 15/389,686, filed concurrently herewith, entitled "PUBLIC KEY ROLLUP FOR MERKLE TREE SIGNATURE SCHEME," co-pending U.S. patent application Ser. No. 15/390,205, filed concurrently herewith, entitled "KEY REVOCATION," and co-pending U.S. patent application Ser. No. 15/389,771, filed concurrently herewith, entitled "HOST ATTESTATION."

BACKGROUND

Protecting the integrity of digital signatures and encrypted communications is an important problem. Many digital signatures and encrypted communications rely on cryptographic keys that are controlled by a signature authority. The signature authority maintains control over the cryptographic keys which are used to generate digital signatures and perform other cryptographic operations. If the signature authority operates as part of a distributed computing environment, cryptographic operations may be performed by a variety of computing entities on behalf of the signature authority. In such situations, the various computing entities acting on behalf of the signature authority may apply digital signatures or establish cryptographically protected communication sessions using a cryptographic key associated with the signature authority. Therefore, controlling the distribution of cryptographic keys from the signature authority to the various computing entities that act on the behalf of the signature authority is an important problem.

BRIEF DESCRIPTION OF THE DRAWINGS

Various techniques will be described with reference to the drawings, in which.

DETAILED DESCRIPTION

Figure 1:
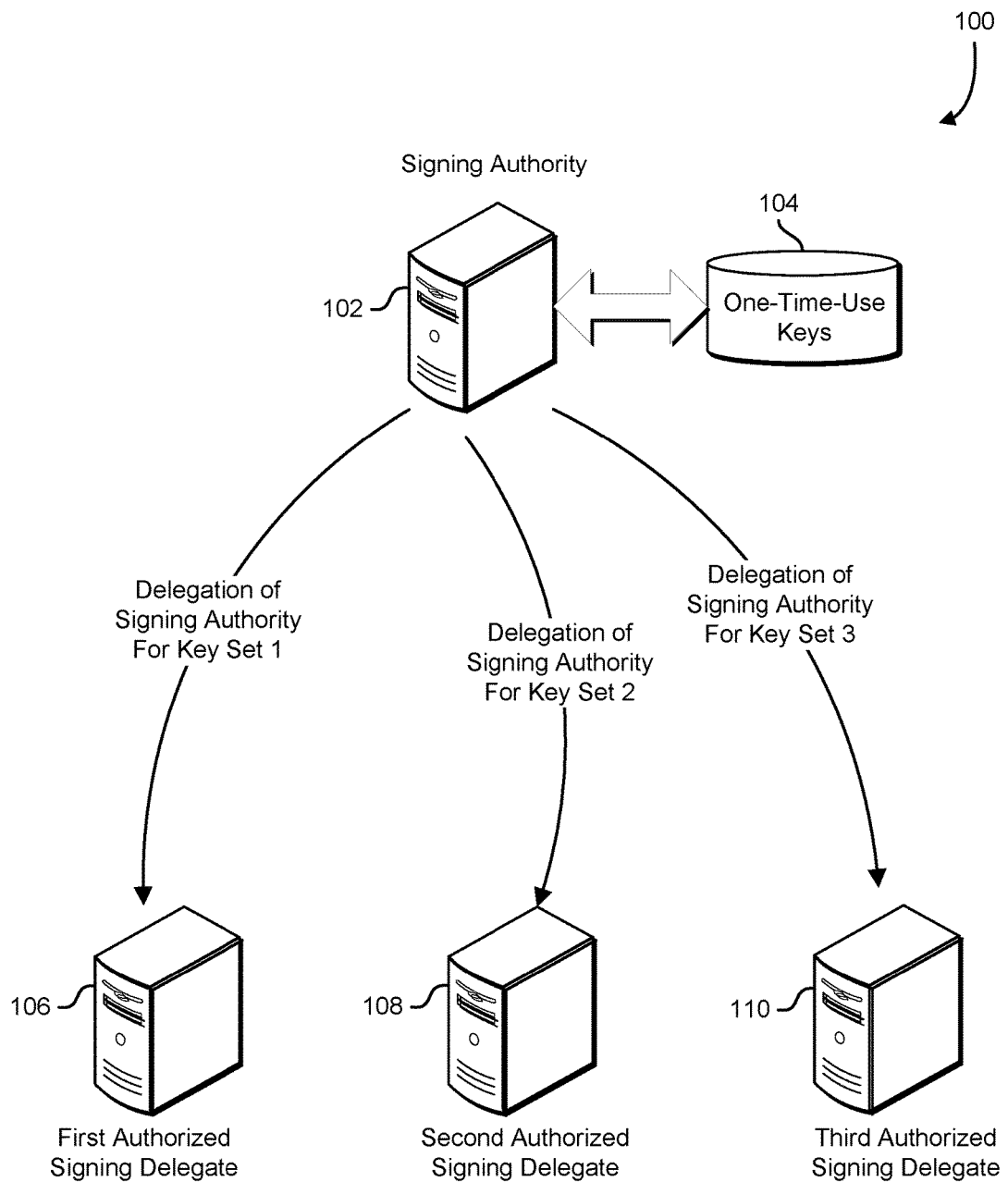
FIG. 1 shows an illustrative example of an environment in which various embodiments may be practiced.

The current document describes methods of generating, distributing, and revoking one-time-use cryptographic keys. One-time-use cryptographic keys may be generated and used as part of a Lamport signature scheme, Winternitz signature scheme, or other cryptographic one-time signature scheme. Each one-time-use cryptographic key includes a secret key and an associated public key or hash value. A signature authority pre-generates a collection of one-time-use cryptographic keys that is used for generating digital signatures. The collection of one-time-use cryptographic keys is generated from a secret seed value, or in some implementations, a set of related seed values, using a key-derivation method. The collection of one-time-use cryptographic keys is arranged in a Merkle tree, and hash values associated with the one-time-use cryptographic keys are used to cryptographically derive a root node of the Merkle tree which serves as a public key for the signature authority.

In some examples, the set of seed values is arranged in a tree structure that corresponds to the structure of the Merkle tree. A master seed value corresponding to the root node of the Merkle tree is used to generate a seed value for each child node of the root node using a one-way function. The seed value associated with each intermediate node is used to generate seed values for each child node. Seed values associated with leaf nodes are used to generate cryptographic keys using a key derivation function.

The signature authority is able to delegate signature authority to a delegate computing entity by providing a portion of the cryptographic keys to the delegate. The signature authority provides a subset of the cryptographic keys to the delegate by providing a seed value corresponding to a node of the Merkle tree to the delegate. Using the seed value, the delegate is able to generate the set of cryptographic keys that are children of the corresponding node of the Merkle tree. In addition to the seed value, the signature authority provides supporting information to the delegate. The supporting information includes the location of the seed value within the Merkle tree, the depth, fanout, and number of cryptographic keys in the Merkle tree, and intermediate hash values in the Merkle tree that are used to verify signatures generated using the delegated cryptographic keys.

When a requester submits a signing request to the delegate, the delegate computing entity generates a digital signature on behalf of the signature authority by selecting a cryptographic key pair that has not yet been used from the delegated set of keys, and generates a digital signature for a message provided by the requester. The delegate provides the requester with the signature, the hashes of the cryptographic key pair, and the hashes associated with intermediate and adjacent nodes of the Merkle tree up to the root node of the signature authority. After producing the digital signature, the delegate marks the selected cryptographic key pair as having been used to generate a digital signature. In many implementations, the selected cryptographic key pair is used once and not reused. If the selected cryptographic key pair is reused, the cryptographic security of the digital signature is greatly reduced with each successive use.

A recipient of the digital signature validates the digital signature by calculating the hash value of the message, confirming that the hash value matches the appropriate portions of the hashes corresponding to the cryptographic key pair, and confirming the hashes of the cryptographic key pair by verifying the hashes of the intermediate Merkle tree nodes up to the root of the signature authority. If any of the checks fail, the digital signature is not valid.

In some examples, the signature authority retains an ability to revoke a digital signature or invalidate a particular cryptographic key. To provide for revocation of a particular cryptographic key, the signature authority determines a secret revocation value and a hash of the secret revocation value. The hash of the secret revocation value (revocation hash), is hashed together with the hash of a particular cryptographic key to produce a leaf-node hash of a Merkle tree. The revocation hash is published with the hash of the secret cryptographic key to enable verification of signatures created with the secret cryptographic key. To revoke the particular cryptographic key, the signature authority publishes the secret revocation value. When a recipient of the digital signature attempts to confirm the validity of the particular cryptographic key, the signature authority indicates that the particular cryptographic key is revoked and provides the secret revocation value as proof that the signature authority is the owner of the particular cryptographic key. The recipient of the digital signature can confirm the secret revocation value by confirming that the hash of the secret revocation value matches the published revocation hash, and that the hashes of the Merkle tree roll up to the published public key. In some implementations, the signature authority provides secret revocation values for non-leaf nodes of the Merkle tree. By publishing a secret revocation value of a non-leaf node, the signature authority may revoke cryptographic keys and associated digital signatures that are children of the non-leaf node within the Merkle tree.

In some examples, the signature authority provides a key-distribution service that distributes blocks of cryptographic keys to authorized signing delegates. An authorized signing delegate contacts the key-distribution service and requests a block of cryptographic keys. The number of cryptographic keys requested by a particular delegate is based at least in part on a predicted volume of digital signatures to be produced by the particular delegate. If the delegate performing digital signatures on behalf of the signature authority runs out of keys, the signature authority may allocate additional cryptographic keys to the delegate via the key-distribution service. The signature authority maintains a record of which keys have been distributed and used. In some implementations, the signature authority monitors the digital signatures produced by signing delegates to ensure that cryptographic keys are not reused.

FIG. 1 shows an illustrative example of an environment in which various embodiments may be practiced. A system diagram 100 shows a signature authority 102 that maintains a database of one-time-use keys 104. The signature authority 102 is a computer server, server cluster, virtual computer system, or other computing appliance configured with one or more services that generate and manage the one-time-use keys. Upon initialization, the signature authority 102 generates a set of one-time-use keys. The set of one-time-use keys is of a finite fixed size. Each one-time-use key may be used to generate a digital signature. If a one-time-use key is used more than once, the cryptographic strength of the resulting digital signature is reduced with each additional use. Therefore, in some implementations, the signature authority 102 maintains a record of key use to track or prevent the reuse of individual cryptographic keys.

The signature authority 102 delegates signature authority to one or more authorized computer systems by providing a subset of the one-time-use keys to each authorized computer system. In the example shown in FIG. 1, the signature authority 102 provides the first key set to a first authorized signing delegate 106, a second key set to a second authorized signing delegate 108, and a third key set to a third authorized signing delegate 110. The signature authority 102 provides the first authorized signing delegate 106, the second authorized signing delegate 108, and the third authorized signing delegate 110 with non-overlapping subsets of the one-time-use keys. The signature authority 102 maintains a record of the key subsets delegated. The signature authority 102 may provide additional information such as key hashes, public keys, and revocation hashes to support the generation of digital signatures by the authorized signing delegates.

The number of cryptographic keys provided to each authorized signing delegate may be based on a predicted number of digital signatures to be generated by each of delegate. In some implementations, the signature authority 102 predicts the number of digital signatures to be generated by each authorized delegate, and provides an appropriate number of cryptographic keys. In another implementation, each delegate requests a particular number of cryptographic keys based on a number of digital signatures predicted by the delegate. In some implementations, if a particular delegate runs out of cryptographic keys, the delegate may request and receive additional keys from the signature authority 102. In another implementation, unused cryptographic keys may be returned from a delegate to the signature authority 102.

In some implementations, the signature authority 102 generates a set of secret revocation values and revocation hashes when the one-time-use keys are generated, and integrates the revocation hashes into a hash tree of the one-time-use keys. When a particular one-time-use key is revoked, the signature authority 102 records the revocation in the database of one-time-use keys 104, and publishes a secret revocation value associated with the revoked one-time-use key as proof of the signature authority's control over the one-time-use key.

Figure 2:
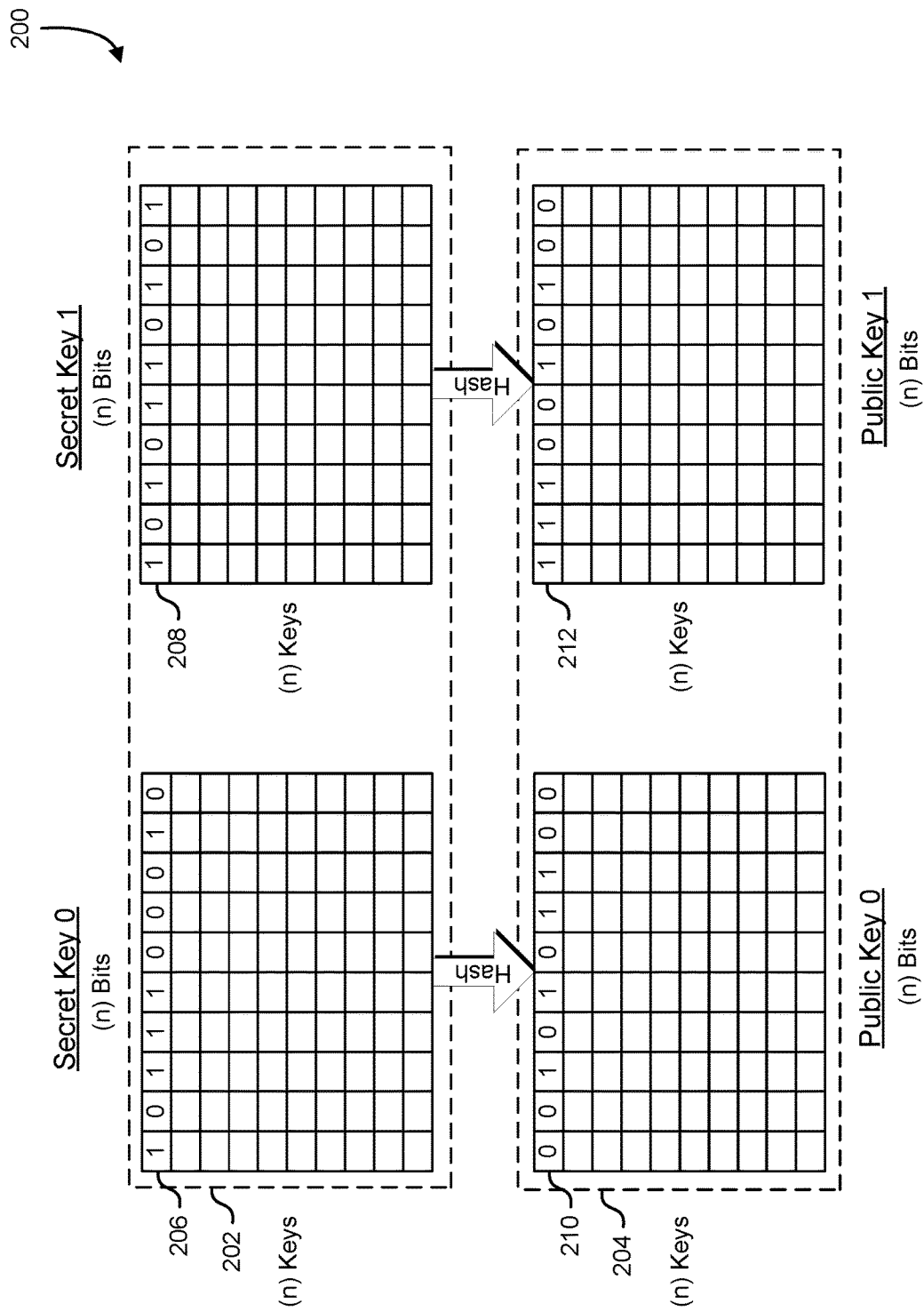
FIG. 2 shows an illustrative example of a one-time-use cryptographic key that includes secret key pairs and corresponding public key pairs.

FIG. 2 shows an illustrative example of a one-time-use cryptographic key that includes secret key pairs and corresponding public key pairs. A diagram 200 shows a one-timeuse key that is generated by a signature authority. The one-time-use key is comprised of a secret key pair 202 and a public key pair 204. The secret key pair 202 includes a first secret key 206 and a second secret key 208. The first secret key 206 and the second secret key 208 each consist of a number (n) of n-bit keys. In some implementations, the first secret key 206 and the second secret key 208 are random numbers generated by the signature authority. In other implementations, the signature authority generates the first secret key 206 and the second secret key 208 from a secret seed value using a key derivation function ("KDF"). In some implementations, the secret seed value is itself generated from another secret seed value managed by the signature authority or owned by a superior signature authority.

The public key pair 204 includes a first public key 210 and a second public key 212. The first public key 210 and the second public key 212 each include a number (n) of n-bit hashes that correspond to the keys of the first secret key 206 and the second secret key 208. Each n-bit key of the secret key pair 202 is used to generate a corresponding n-bit hash of the public key pair 204. For example, the hash of the first key of the first secret key 206 is the first hash of the first public key 210. Each hash is generated with a cryptographic hash function or one-way function $h(x)=y$ where y is easy to calculate for a given x, but x is computationally difficult to calculate for a given y. In some examples, SHA256, MD5, BLAKE, or BLAKE2 hash functions are used to generate the hashes. The public key pair 204 is published by the signature authority.

Figure 3:
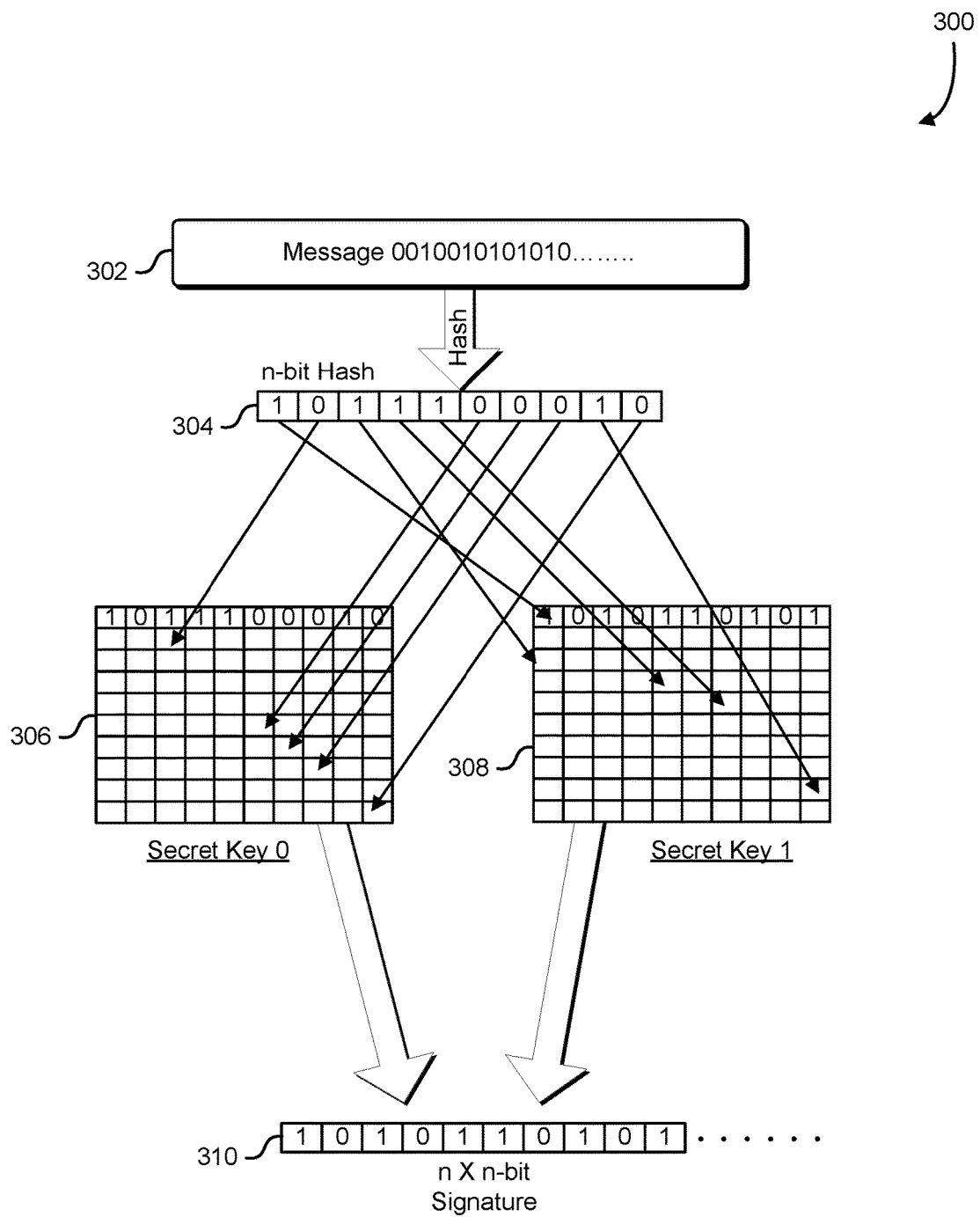
FIG. 3 shows an illustrative example of signing a message with a one-time-use cryptographic key.

FIG. 3 shows an illustrative example of signing a message with a one-time-use cryptographic key. A diagram 300 illustrates the signing of a message 302 by a signature authority using a one-time-use key. In various examples, the message 302 may be a network packet, digital certificate, transactional record, media file, legal document, or other message submitted for signing by a requester. The signature authority receives the message 302 from the requester and determines an n-bit message hash 304 using a cryptographic hash function or other one-way function. A one-way function or cryptographic hash has the property that for a given input, a hash value is relatively easy to calculate, but for a given hash value, an input that produces the given hash value is comparatively difficult. In various examples, cryptographic hash functions such as SHA-256, MD-5, or BLAKE may be used as the cryptographic hash function.

To sign the message 302, the signature authority selects a one-time-use key for use in generating the digital signature. In some examples, if the signature authority has exhausted the supply of one-time-use keys, the signature authority reports an error and does not sign the message 302. In other examples, if the signature authority has used the supply of one-time-use keys, a key may be selected for reuse. A particular cryptographic key may be selected for reuse based at least in part on the number of times the particular key has been reused and the particular secret keys used to generate previous signatures. In some implementations, the signature authority maintains a key-use database that records the number of times each key has been used, and the digital signature generated with each key. In some examples, to locate a key for reuse, the signature authority may locate those keys that have been used the least number of times to generate digital signatures. In another example, the signature authority is provided with the message to be signed, and the signature authority identifies a cryptographic key for reuse that, when generating a digital signature for the message, reveals the lowest number of additional secret key portions of the available reusable cryptographic keys.

The one-time-use key includes a secret key pair that includes a first secret key 306 and a second secret key 308. For each bit (m) of the n-bit message hash 304, the signature authority selects either the m'th key from the first secret key if the bit is a zero bit, or the m'th key from the second secret key if the bit is a one bit. The selected keys are concatenated to form a digital signature 310 having n-squared bits. The digital signature 310 is provided to the requester. In addition to the digital signature 310, the requester is provided with public key information associated with the selected one-time-use key to support the verification of the digital signature 310. The public key information may include one or more hashes of a hash tree or Merkle tree that link the public key information to a public key of the signature authority. For each bit of the n-bit message hash 304, a secret key is chosen from either the first secret key 306 or the second secret key. For 'zero' bits of the n-bit message hash 304, a secret key corresponding to the bit in the n-bit message hash is selected from the first secret key 306. For 'one' bits of the n-bit message hash 304, a secret key corresponding to the bit in the n-bit message hash is selected from the second secret key 308. The bit position within the n-bit message hash 304 corresponds to the row (key number) within either the first secret key 306 or second secret key 308. In the example shown in FIG. 3, for each bit of the n-bit message hash, an arrow indicates the row of the particular secret key (having n-bits) which is added to the resulting digital signature 310.

Figure 4:
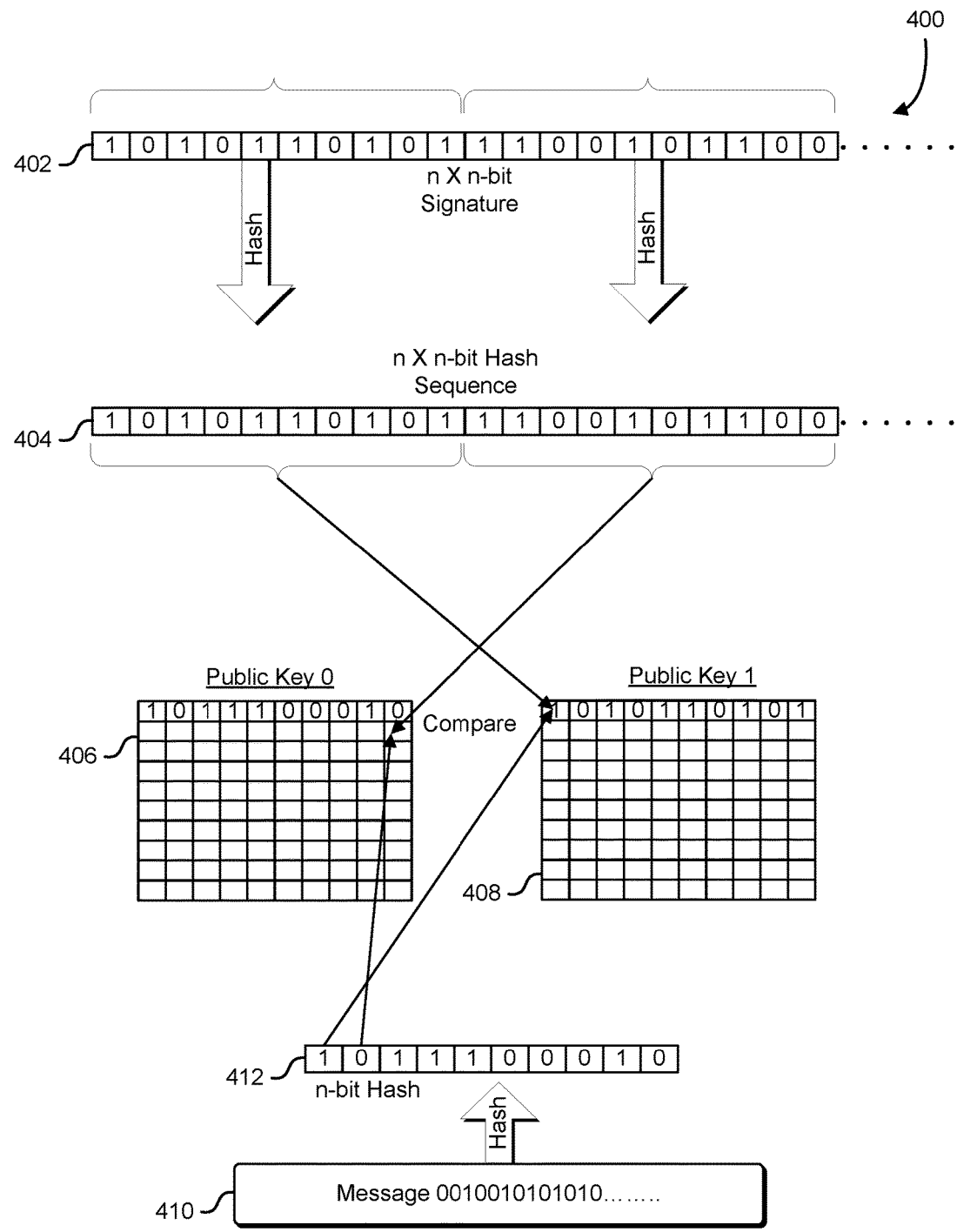
FIG. 4 shows an illustrative example of verifying a message with a one-time-use cryptographic key.

FIG. 4 shows an illustrative example of verifying a message with a one-time-use cryptographic key. A diagram 400 illustrates how a recipient of a signed message is able to verify a digital signature. To verify the signed message, the recipient separates a digital signature 402 from the signed message. The digital signature 402 has n-squared bits, and the recipient divides the digital signature 402 into n-key portions of n-bits each. The recipient determines a hash of each key portion and assembles the hashes into a hash sequence 404 of n, n-bit hashes.

Using information provided with the digital signature, the recipient identifies the particular one-time-use-key used to generate the digital signature and requests related public key information from a signature authority. The signature authority provides the recipient with a public key pair corresponding to the one-time-use key used to generate the digital signature. The public key pair includes a first set of public keys 406 and a second set of public keys 408.

The recipient extracts a message body 410 from the signed message and uses a cryptographic hash function to determine an n-bit message hash 412 for the message body 410. For each bit (m) of the n-bit message hash 412, the recipient determines whether the bit is a one or zero. If the bit is a zero, the recipient compares the m'th key of the first set of public keys 406 to the m'th hash of the hash sequence 404. If the bit is a one, the recipient compares the m'th key of the second set of public keys 408 to the m'th hash of the hash sequence 404. If any of the comparisons do not match, the signature is not valid for the provided message. If the comparisons match, the signature is valid. In some implementations, additional verifications are performed to confirm that the public keys provided are in compliance with a Merkle tree or hash tree maintained by a signature authority. For each bit of the n-bit message hash 412, a public key is chosen from either the first set of public keys 406 or the second set of public keys 408. For 'zero' bits of the n-bit message hash 412, a public key corresponding to the bit in the n-bit message hash is selected from the first set of public keys 406. For 'one' bits of the n-bit message hash 412, a public key corresponding to the bit in the n-bit message hash 412 is selected from the second set of public keys 408. The bit position within the n-bit message hash 412 corresponds to the row (key number) within either the first set of public keys 406 or second set of public keys 408. In the example shown in FIG. 4, for each bit of the n-bit message hash, an arrow indicates the row of the particular public key (having n-bits) that is compared to the hash sequence 404.

Figure 5:
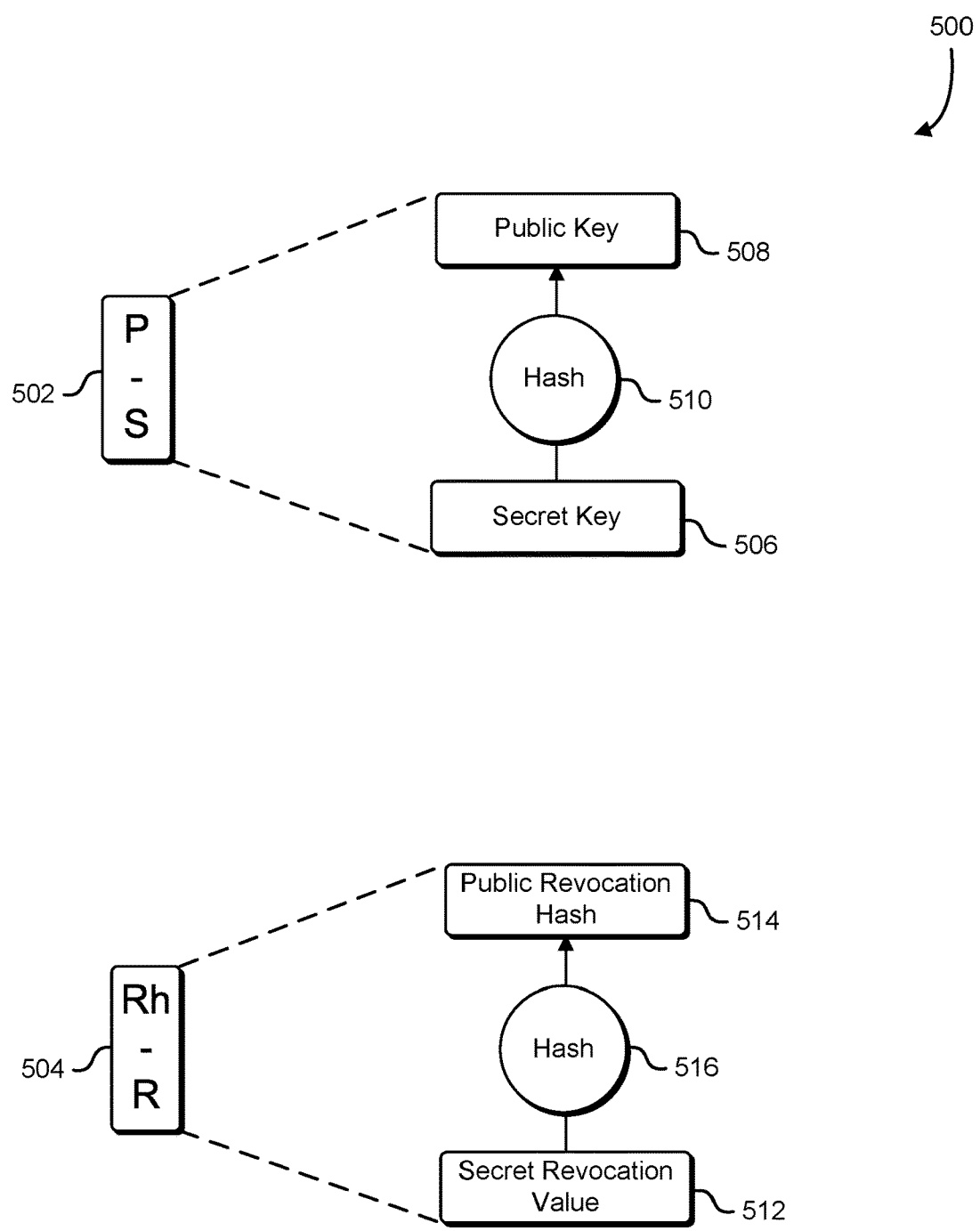
FIG. 5 shows an illustrative example of a secret key with an associated public key, and a revocation key with an associated revocation hash value.

FIG. 5 shows an illustrative example of a secret key with an associated public key and a revocation key with an associated revocation hash value. A diagram 500 shows a one-time-use cryptographic key 502 and a one-time-use revocation value 504. The one-time-use cryptographic key 502 comprises a secret key portion 506 and a public key portion 508 that is cryptographically derived from the secret key portion 506. Cryptographically derived from a value means using a one-way function at least once using inputs that are the values or derived from the values (possibly cryptographically derived from the values). In some examples, the public key portion 508 is cryptographically derived from the secret key portion using a hash function 510 such as a cryptographic hash or one-way function. In another example, the public key portion 508 is cryptographically derived from the secret key portion using encryption. An encryption operation may be one-way to entities that do not have a corresponding decryption key. The one-time-use cryptographic key 502 may be a key used in a Lamport signature scheme, a Winternitz signature scheme, or other one-time-use signature scheme using public and secret key pairs. In some implementations, the one-time-use cryptographic key 502 is arranged in a hash tree, Merkle tree, or other structure where the public key portion 508 is hashed with other public key portions of other one-time-use cryptographic keys into a single public key of a signature entity.

The one-time-use revocation value 504 comprises a secret revocation value 512 and a public revocation hash 514 that is cryptographically derived from the secret revocation value 512. In some examples, the public revocation hash 514 is derived using a hash function 516 such as a cryptographic hash or other one-way function. The hash function 516 may be a cryptographic hash or other one-way function that is different from a hash function 510 used to derive the public key portion 508. In various implementations, the public revocation hash 514 is combined with the public key portion 508 to generate a hash value used to verify the integrity of a digital signature generated with the one-time-use cryptographic key 502. A signature authority with control over the one-time-use cryptographic key 502 may publish the secret revocation value 512 as an indication that the one-time-use cryptographic key 502 has been revoked and is no longer valid.

In the following figures, the combination of the public key portion 508 and the secret key portion 506 may be represented as a public key/secret key pair, and the combination of the public revocation hash 514 and the secret revocation value 512 may be represented as a revocation value/revocation hash pair.

Figure 6:
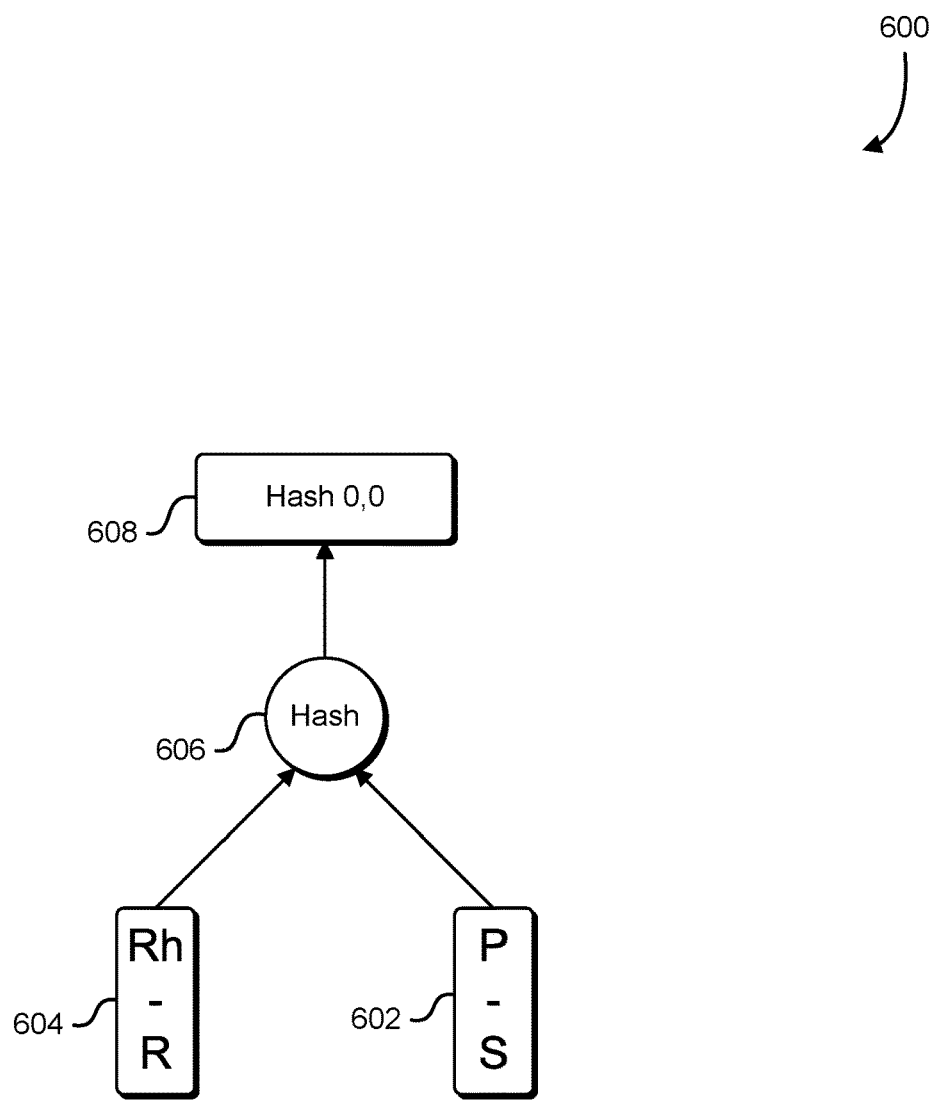
FIG. 6 shows an illustrative example of a secret key with an associated revocation key that may be used to revoke the signature authority of the secret key.

FIG. 6 shows an illustrative example of a secret key with an associated revocation key that may be used to revoke the signature authority of the secret key. A diagram 600 shows how a one-time-use cryptographic key 602 and an associated revocation pair 604 may be combined to create a revocable one-time-use cryptographic key. The one-time-use cryptographic key 602 is comprised of a secret key and a public key cryptographically derived from the secret key. The revocation pair 604 is comprised of a revocation value and a revocation hash cryptographically derived from the revocation value. In some examples, the revocation hash is based on a cryptographic hash or one-way function of the revocation value. The public key of the one-time-use cryptographic key 602 and the revocation hash of the revocation pair 604 are concatenated and fed to a hash function 606. The hash function 606 generates a linking hash 608 for the combination of the one-time-use cryptographic key 602 and the associated revocation pair 604.

Each one-time-use cryptographic key is maintained by a signature authority in a structure as shown in FIG. 6, and each one-time-use cryptographic key has an associated revocation value. Authority over revoking a particular cryptographic key is controlled by the revocation value. In some examples, the signature authority retains control over the revocation values and determines whether a particular cryptographic key is revoked. In other examples, the signature authority delegates control over the revocation process by providing the revocation values to a delegated entity. In yet another example, the revocation values and revocation hashes are generated by a key-revocation authority, and the revocation hashes are provided to a signature authority. The signature authority incorporates the revocation hashes into the revocable key hash. The entity controlling the revocation values authorizes the revocation of one-time-use cryptographic keys by publishing the revocation values of the one-time-use cryptographic keys to be revoked.

A recipient that receives a cryptographic key or a message signed with the cryptographic key contacts the revocation authority to determine whether the cryptographic key has been revoked. The revocation authority maintains a database of revoked cryptographic keys and indicates to the recipient whether the cryptographic key is revoked. If the cryptographic key is revoked, the revocation authority provides a revocation value associated with the cryptographic key as proof that the cryptographic key was revoked by an authorized revocation authority. The recipient confirms the correctness of the revocation value by determining a hash of the revocation value, and combining the hash of the revocation value and a public key associated with the cryptographic key. If the hash of the combination matches the revocable key hash of the cryptographic key, the revocation value is valid. If the hash of the combinations does not match the revocable key hash of the cryptographic key, the revocation value is not valid and the key is not revoked.

Figure 7:
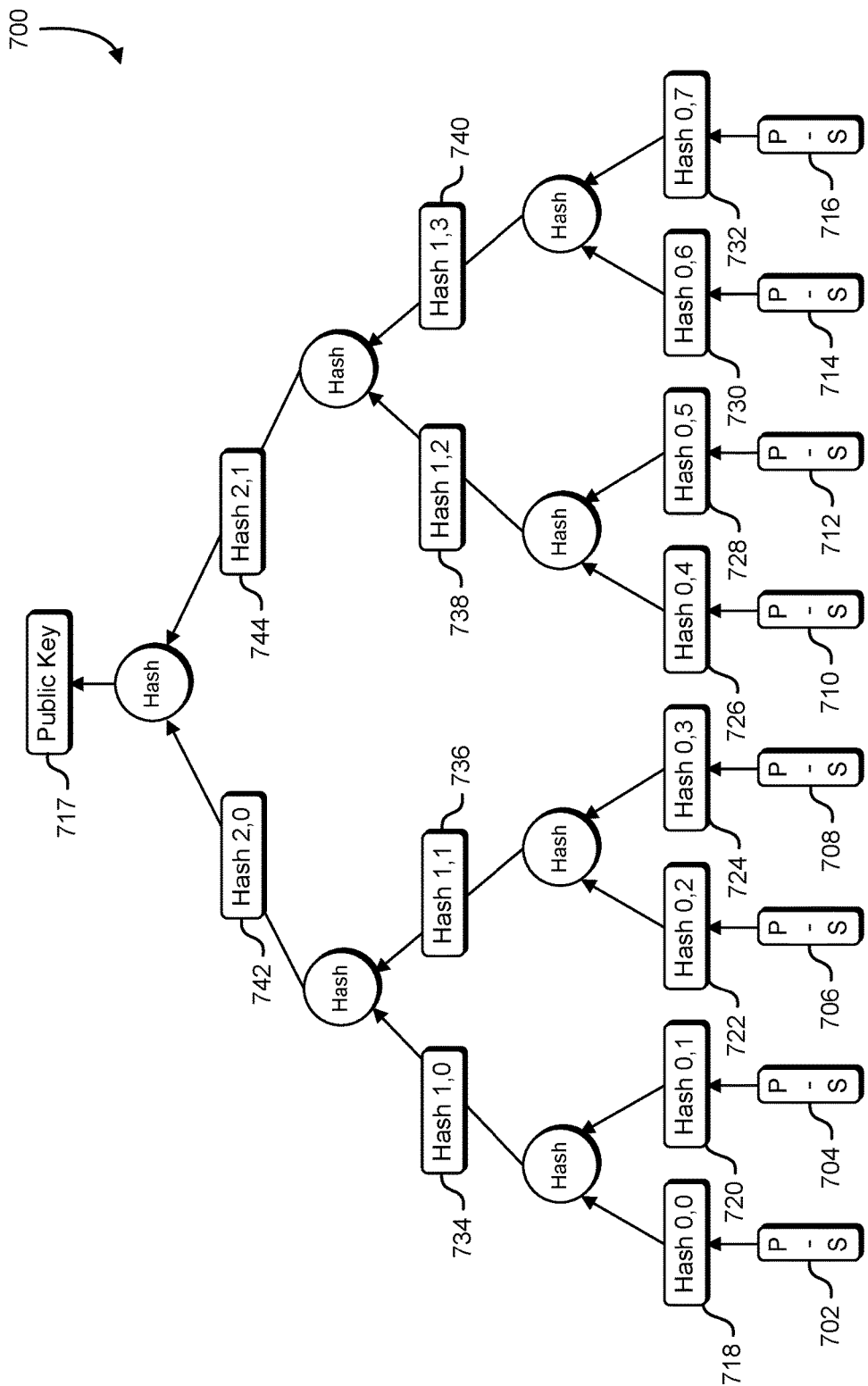
FIG. 7 shows an illustrative example of a Merkle tree of one-time-use cryptographic keys.

FIG. 7 shows an illustrative example of a Merkle tree of one-time-use cryptographic keys. A diagram 700 shows a binary Merkle tree that links a collection of one-time-use cryptographic keys 702, 704, 706, 708, 710, 712, 714, and 716 to a public key 717 associated with a signature authority. Each one-time-use cryptographic key is comprised of a secret key and a public key derived from the secret key using a cryptographic hash. In some examples, the secret key consists of n-pairs of n-bit secret keys, and the public key consists of n-pairs of n-bit hashes that correspond to the n-bit secret keys. The public keys are published by the signature authority, and the secret keys are maintained by the signature authority for use in generating digital signatures. A collection of corresponding level-0 hash nodes 718, 720, 722, 724, 726, 728, 730, and 732 are generated from the public keys of the one-time-use cryptographic keys. In some examples, each level-0 hash node is generated by taking a cryptographic hash of a public key of an associated one-time-use cryptographic key.

The level-0 hash nodes are incorporated into the Merkle tree. Pairs of level-0 hash nodes are combined using a cryptographic hash function to generate a set of four level-1 hash nodes 734, 736, 738, and 740. In the example shown in FIG. 7, hash 0,0 and hash 0,1 are concatenated and hashed to generate hash 1,0. Hash 0,2 and hash 0,3 are concatenated and hashed to generate hash 1,1. Hash 0,4 and hash 0,5 are concatenated and hashed to generate hash 1,2. Hash 0,6 and hash 0,7 are concatenated and hashed to generate hash 1,3. The four level-1 hash nodes are combined to generate two level-2 hash nodes 742 and 744. In the example shown in FIG. 7, hash 1,0 and hash 1,1 are concatenated and hashed to generate hash 2,0, and hash 1,2 and hash 1,3 are concatenated and hashed to generate hash 2,1. The level-2 hash nodes 742 and 744 are combined and hashed to produce the public key 717. The public key 717 is published by the signature authority so that recipients of a digital signature are able to confirm that the signature was generated with a one-time-use cryptographic key that is linked to the Merkle tree.

A recipient of a digital signature validates the signature using the public key information associated with the one-time-use cryptographic key used to generate the digital signature. The public key information is validated against the public key 717 that is associated with a signature authority. The signature authority provides the recipient of the digital signature with the hash value nodes of the Merkle tree that are necessary to re-create the public key 717 from the public key information.

For example, if the one-time-use cryptographic key 706 is used to generate the digital signature, the public key information associated with the one-time-use cryptographic key 706 is used to confirm that the digital signature was created from the secret key associated with the one-time-use cryptographic key 706. The level-0 hash node 722 can be re-created by the recipient using the public key information associated with the one-time-use cryptographic key 706. In addition to the public key 717, the signature authority provides the level-0 hash node 724, the level-1 hash node 734, and the level-2 hash node 744. The recipient uses the determined level-0 hash node 722 and the provided level-0 hash node 724 to generate the level-1 hash node 736. The recipient uses the generated level-1 hash node 736 and the provided level-1 hash node 734 to generate the level-2 hash node 742. The generated level-2 hash node 742 and the provided level-2 hash node 744 are used to generate the public key 717. If the generated public key matches the published public key provided by the signature authority, the one-time-use cryptographic key 706 is a valid member of the Merkle tree. If the generated public key does not match the published public key, the one-time-use cryptographic key 706 is not a valid member of the Merkle tree.

Figure 8:
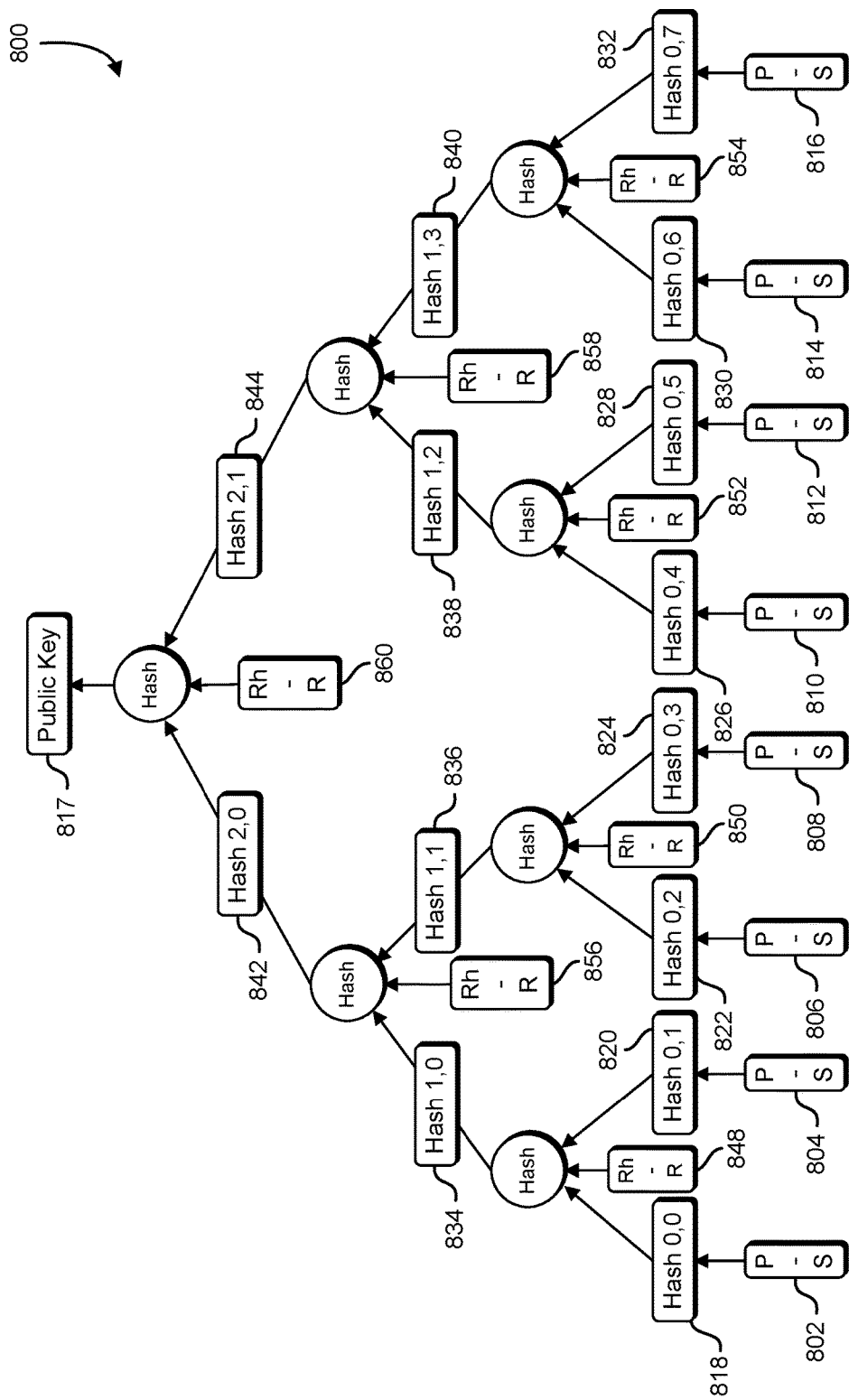
FIG. 8 shows an illustrative example of a Merkle tree of one-time-use cryptographic keys that includes revocation keys for revoking portions of the tree.

FIG. 8 shows an illustrative example of a Merkle tree of one-time-use cryptographic keys that includes revocation keys for revoking portions of the tree. A diagram 800 shows a Merkle tree of one-time-use cryptographic keys that includes revocation nodes for the internal nodes of the tree. The Merkle tree links a collection of one-time-use cryptographic keys 802, 804, 806, 808, 810, 812, 814, and 816 to a public key 817 associated with a signature authority. Each one-time-use cryptographic key includes a secret key and a public key that is generated from the secret key using a cryptographic hash. Values associated with the various internal nodes of the Merkle tree are created by combining the values associated with the child nodes of the particular internal node, and determining a cryptographic hash of the combined value. In some implementations, the values associated with the child nodes are combined by concatenating the values associated with the various child nodes and determining a cryptographic hash of the concatenated value.

A set of eight level-0 hash nodes 818, 820, 822, 824, 826, 828, 830, and 832 is combined with four level-0 revocation pairs 848, 850, 852, and 854 to produce four level-1 hash nodes 834, 836, 838, and 840. Each revocation pair includes a revocation value and a revocation hash that is based on the revocation value. In the example shown in FIG. 8, the level-0 hash node 818 and the level-0 hash node 820 are combined with the revocation hash of revocation pair 848 to produce the level-1 hash node 834. The level-0 hash node 822 and the level-0 hash node 824 are combined with the revocation hash of revocation pair 850 to produce the level-1 hash node 836. The level-0 hash node 826 and the level-0 hash node 828 are combined with the revocation hash of revocation pair 852 to produce the level-1 hash node 838. The level-0 hash node 830 and the level-0 hash node 832 are combined with the revocation hash of revocation pair 854 to produce the level-1 hash node 840.

The set of four level-1 hash nodes 834, 836, 838, and 840 is combined with the revocation hashes of two level-1 revocation pairs 856 and 858 to produce two level-2 hash nodes 842 and 844. The level-1 hash node 834 and the level-1 hash node 836 are combined with the revocation hash of the level-1 revocation pair 856 to produce the level-2 hash node 842. The level-1 hash node 838 and the level-1 hash node 840 are combined with the revocation hash of the level-1 revocation pair 858 to produce the level-2 hash node 844. The two level-2 hash nodes 842 and 844 are combined with the level-2 revocation pair 860 to produce the public key 817.

The signature authority is able to use the revocation pairs to indicate revocation of a set of one-time-use cryptographic keys that are subordinate to a particular node of the Merkle tree by publishing the revocation value associated with the particular node. For example, by publishing the revocation value associated with the revocation pair 850, the signature authority proves the revocation of the one-time-use cryptographic keys 806 and 808. In another example, the signature authority is able to revoke the one-time-use cryptographic keys 810, 812, 814, and 816 by publishing the revocation value associated with the revocation pair 858.

In some implementations, each one-time-use cryptographic key shown in FIG. 8 is replaced with a structure that includes a corresponding revocation value as shown in FIG. 6, and the level-0 hashes are replaced with revocable one-time-use key hashes as shown in FIG. 6. In such implementations, the revocation authority may revoke an individual one-time-use cryptographic key by publishing the revocation value associated with the individual one-time-use cryptographic key.

In some implementations, the revocation pairs may be generated by a revocation authority other than the signature authority, and the revocation hashes are provided to the signature authority for inclusion in the Merkle tree. Particular one-time-use cryptographic keys are revoked by the revocation authority publishing one or more revocation values.

Figure 9:
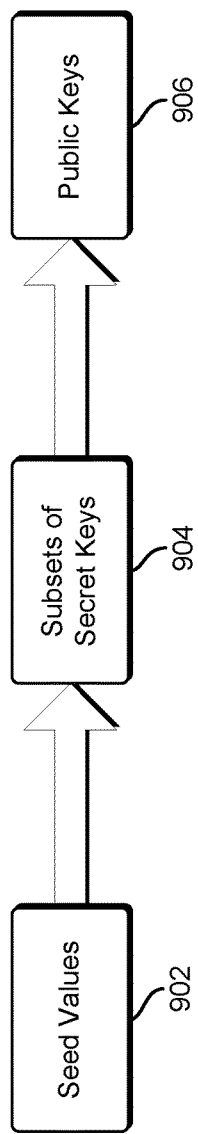
FIG. 9 shows an illustrative example of a set of seed values that are used to generate a set of one-time-use keys and corresponding public keys.

FIG. 9 shows an illustrative example of a set of seed values that are used to generate a set of one-time-use keys and corresponding public keys. A diagram 900 illustrates a process whereby one or more seed values 902 are used to generate a number of secret keys 904. A corresponding collection of public keys 906 is generated from the secret keys 904 using a cryptographic hash function. In some examples, the one or more seed values 902 is a single seed value that generates a plurality of secret keys. In another example, the one or more seed values 902 is a plurality of seed values, each of which generates one or more secret keys. In yet another example, the one or more seed values 902 is a plurality of related seed values, and each seed value generates a set of secret keys. For example, a master seed value may be used to generate a number of subordinate seed values, and each subordinate seed value is used to generate a subset of secret keys. An original seed value may be used to generate another seed value by applying a cryptographic hash or one-way function to the original seed value.

The secret keys 904 are generated from the seed values 902. Any number of secret keys may be generated from a single seed value. In some examples, the secret keys 904 are generated using a key derivation function, key stretching algorithm, key strengthening algorithm, or cryptographic hash. In another example, the secret keys 904 are generated using linear feedback shift register or pseudo-random number generation algorithm using the seed value as an initializer. The public keys 906 are generated from the secret keys 904 using a cryptographic hash or one-way function in accordance with the type of one-time-use cryptographic key desired by generating the one-time-use cryptographic keys from a set of seed values, and the seed values may be used as a shorthand to distribute subsets of the one-time-use cryptographic keys to delegate signature authorities.

Figure 10:
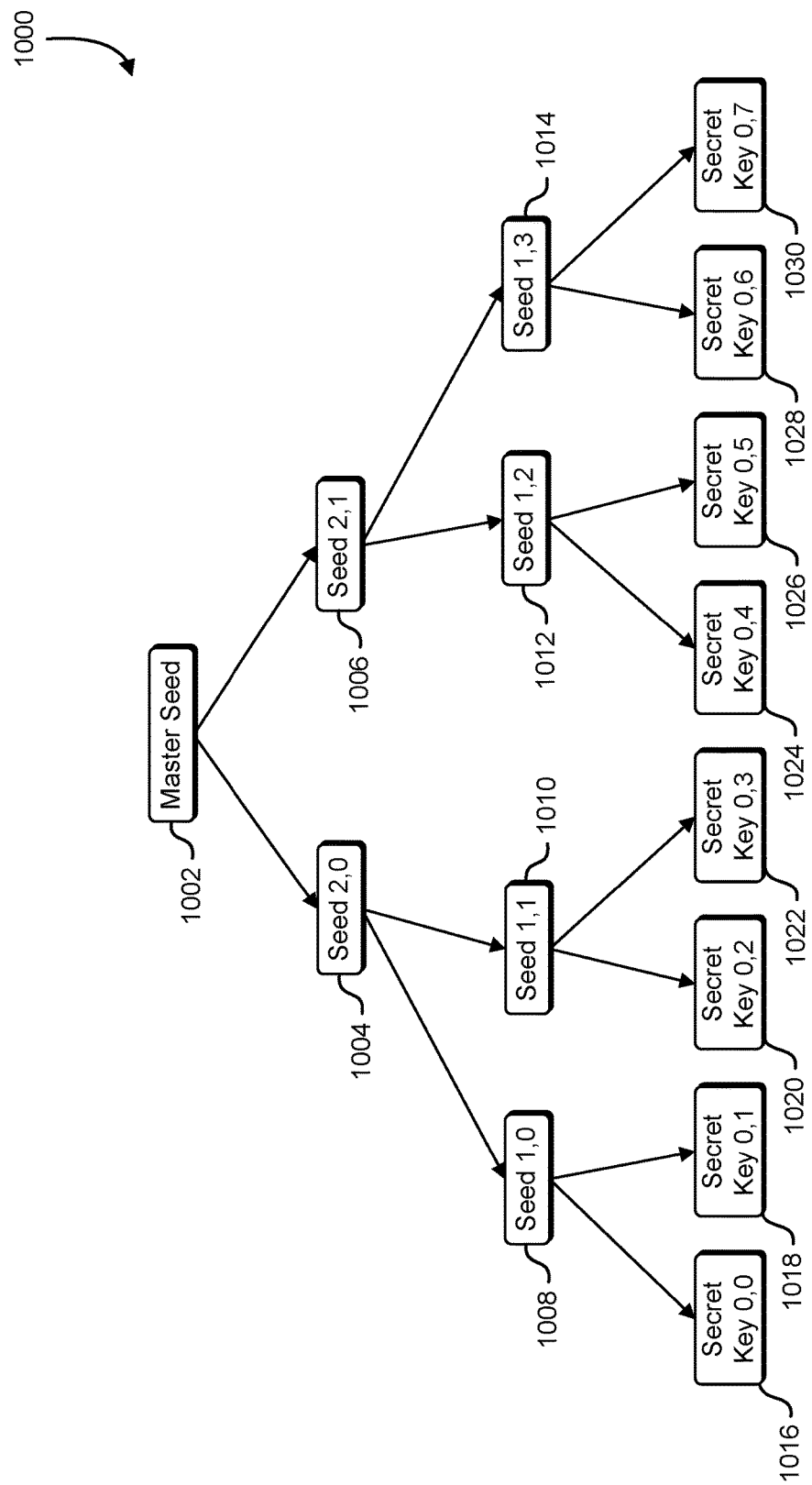
FIG. 10 shows an illustrative example of a set of one-time-use cryptographic keys that are generated from a tree of seed values.

FIG. 10 shows an illustrative example of a set of one-time-use cryptographic keys that are generated from a tree of seed values. A diagram 1000 illustrates a tree structure containing a collection of related seed values that are used to generate a collection of secret keys. The tree structure may be generated by a signature entity or other entity that is responsible for generating a collection of one-time-use cryptographic keys. A master seed 1002 controls the generation of the remaining seeds and the secret keys. The master seed 1002 is randomly generated by the signature entity. Each of the subordinate nodes of the master seed 1002 is generated by applying a one-way function or cryptographic hash to the value of the parent node, an optional salt value, and an index. For example, two child seed values are generated from the master seed 1002. Using a published cryptographic hash function, an optional salt value, and a node index, the signature authority generates a first level-2 seed 1004 (index-1) and a second level-2 seed 1006 (index=2). Each of the level-2 seed values is used to generate two additional subordinate seed values using the one-way function or cryptographic hash. The first level-2 seed 1004 is used to generate a first level-1 seed 1008 and a second level-1 seed 1010, and the second level-2 seed 1006 is used to generate a third level-1 seed 1012 and a fourth level-1 seed 1014.

The level-1 seed values are used to generate a collection of secret keys associated with one-time-use keys. The secret keys are derived from the level-1 seed values using a combination of a cryptographic hash and a key derivation function. The use of a cryptographic hash prevents the holder of a secret key from deriving the seed value used to generate the secret key and therefore prevents access to other secret keys derived from the same seed value. The key derivation function produces an output in a format that is appropriate for use as a secret key. In the example shown in FIG. 10, each level-1 seed value is used to generate two secret keys. The first level-1 seed 1008 is used to generate a first secret key 1016 and a second secret key 1018. The second level-1 seed 1010 is used to generate a first secret key 1020 and a second secret key 1022. The third level-1 seed 1012 is used to generate a first secret key 1024 and a second secret key 1026. The fourth level-1 seed 1014 is used to generate a first secret key 1028 and a second secret key 1030.

In many examples, the secret keys are used as the basis to create a collection of one-time-use cryptographic keys. The signature authority hashes the secret keys to produce a complementary set of public keys which are arranged in a Merkle tree. The Merkle tree may have a structure similar to the structure of the seeds used to produce the secret keys. Groups of one-time-use keys may be delegated to a subordinate signature authority by providing a seed value corresponding to a common parent node of the one-time-use keys to be delegated. Using the seed value, the subordinate signature authority may regenerate the secret keys for the corresponding nodes of the Merkle tree.

In other implementations, the structure of the tree used to organize the seed values is different from the structure of the Merkle tree. In some examples the tree of seed values may be constructed with a structure that matches an organizational structure, with the master seed being controlled by a central corporate authority, and internal nodes of the seed tree representing particular departments within the corporation. In other examples, the tree of seed values may be arranged in accordance with a hierarchy of potential signature delegates. In some implementations, the structure of the seed-value tree includes a root seed and an internal layer of seed nodes that can be delegated to one or more signature delegates. Each internal seed node is used to generate a number of secret keys that can be delegated as a unit. Regardless of the structure of the seed-value tree, the resulting secret keys are used to generate a corresponding set of public keys, and the public keys are hashed and linked to a Merkle tree.

Figure 11:
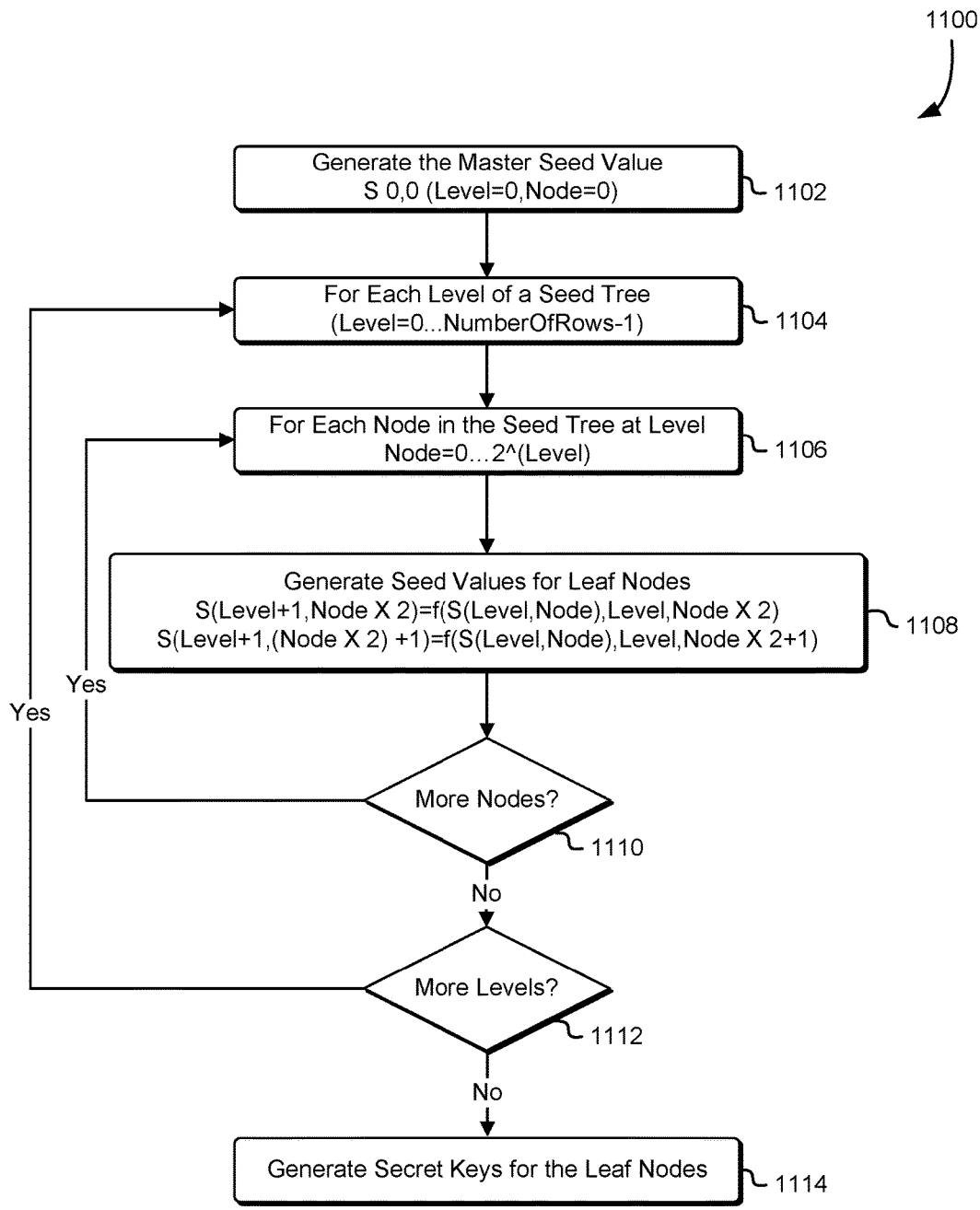
FIG. 11 shows an illustrative example of a process that, as a result of being performed by a signature authority, generates a seed tree that supports delegation of one-time-use cryptographic keys.

FIG. 11 shows an illustrative example of a process that, as a result of being performed by a signature authority, generates a seed tree that supports delegation of one-time-use cryptographic keys. A flowchart 1100 illustrates a process that begins at block 1102 with the signature authority generating a master seed value. The master seed value is a random number and may be generated using hardware or software based on random number generation techniques. The master seed value is placed in a tree-node record allocated in memory by the signature authority. Each tree-node record includes one or more pointers that reference child nodes.

After generating the master seed value, the signature authority continues constructing the seed tree at block 1104. At block 1104, the signature authority initiates a loop that iterates over each level of the desired seed tree starting at the top with the master seed value node and ending one level above the leaf nodes. Within the above loop, at block 1106, the signature authority iterates over each tree-node at the iterated level. At block 1108, the signature authority generates child nodes for each iterated tree node. For each tree node, the signature authority allocates new child nodes in memory and sets pointers from the iterated tree node to each of the new child nodes. The signature authority generates a value for each new child node that is determined based on a function of the seed value of the iterated tree node and the position of the new child node. In some examples, the value of each new child node is determined by a function that takes the value of the seed of the parent node, the level of the parent node, the position of the parent node within the level, and the number of child nodes associated with the parent. The function by which the seed values of new child nodes are determined is a one-way function or cryptographic hash that prevents the derivation of parent seed values from child seed values.

At decision block 1110, the signature authority determines whether there are additional nodes at the currently iterated tree level. If there are additional nodes in the currently iterated tree level, execution returns to block 1106 and new child nodes for the next node in the iterated tree level are created. If there are not additional nodes in the currently iterated tree level, execution advances to decision block 1112. At decision block 1112, the signature authority determines whether there are additional levels of the seed tree to be processed. If there are additional levels of the seed tree to be processed, execution returns to block 1104 and the next level of the seed tree is processed. If there are not additional levels of the seed tree to be processed, execution advances to block 1114.

At block 1114, the signature authority generates secret keys from the lowest level of the seed tree. In some examples, the signature authority generates a single secret key from each seed node at the bottom of the seed tree. In another example, the signature authority generates a number of secret keys from each seed node at the bottom of the seed tree. In some examples, the secret keys are generated using a combination of a one-way function or cryptographic hash and a key derivation function so that the secret keys may not be used to easily derive the seed value. In another example, the secret keys are generated using a key derivation function that uses the seed value as input.

Figure 12:
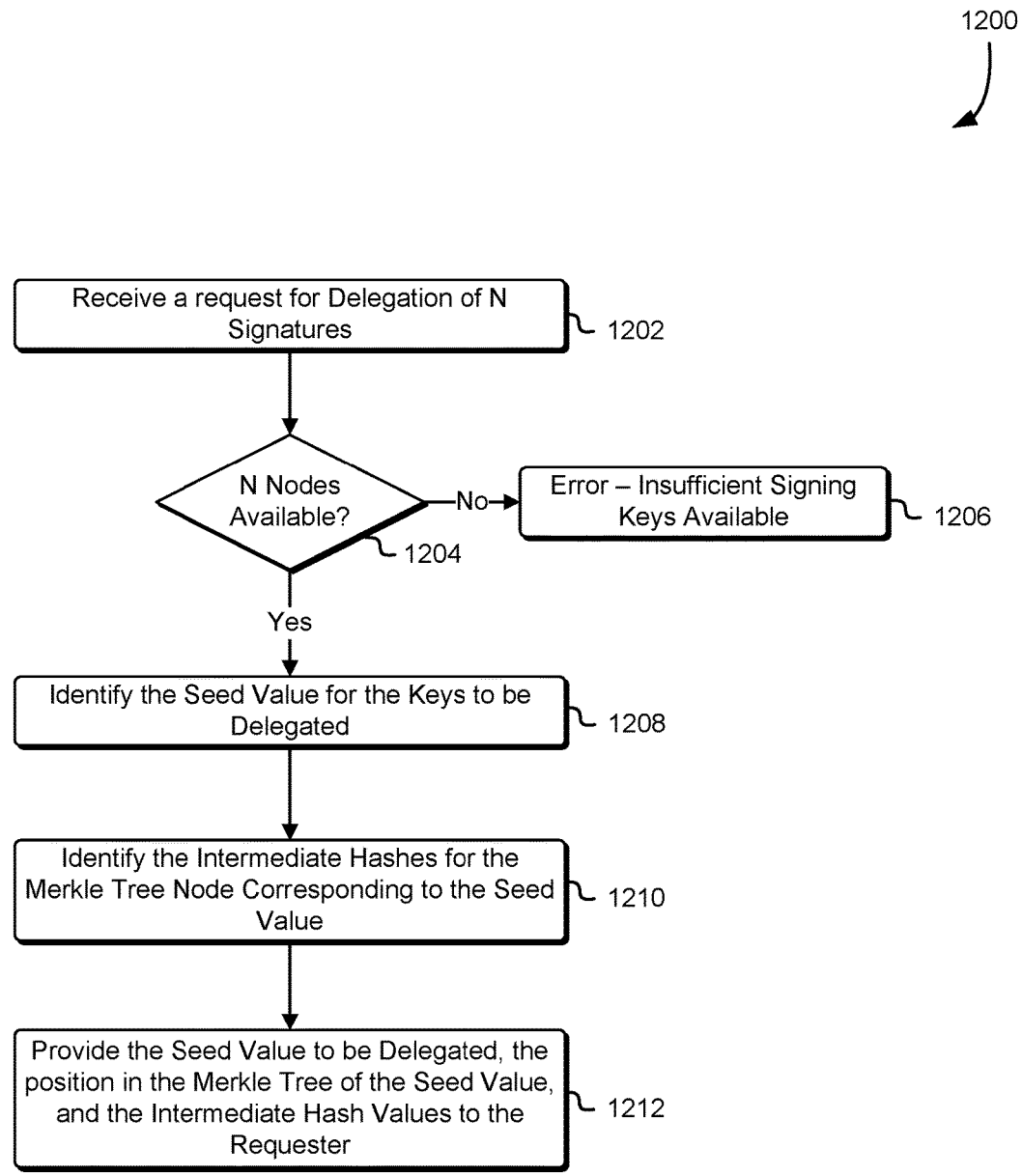
FIG. 12 shows an illustrative example of a process that, as a result of being performed by a signature authority, delegates a portion of one-time-use cryptographic keys to an authorized entity.

FIG. 12 shows an illustrative example of a process that, as a result of being performed by a signature authority, delegates a portion of one-time-use cryptographic keys to an authorized entity. A flowchart 1200 illustrates a process that begins at block 1202 with a signature authority receiving a request from a prospective delegate to generate digital signatures on behalf of the signature authority. To generate the digital signatures, the prospective delegate requests a number of one-time-use keys from the signature authority. The perspective delegate may be a server, server cluster, or other computing entity operated by a business, department, or subsidiary of the signature authority. The signature authority authenticates the identity of the prospective delegate using a combination of digital certificates, biometric measures, or multiply-factor authentication techniques. After authenticating the prospective delegate, the signature authority may consult an authorization database to confirm that the prospective delegate is authorized to generate signatures on behalf of the signature authority. If the prospective delegate is authorized to generate signatures on behalf of the signature authority, execution advances to decision block 1204.

At decision block 1204, the signature authority examines a store of one-time-use keys that are maintained by the signature authority for generating digital signatures. The store includes information that describes which of the one-time-use keys have been previously used to generate digital signatures. If the number of one-time-use keys requested by the prospective delegate is greater than the number of one-time-use keys that have not yet been used to generate a digital signature, execution advances to block 1206 and the signature authority generates an error. At block 1206, the signature authority indicates to the prospective delegate that there are insufficient one-time-use keys available to satisfy the request, and the request is denied.

If there are sufficient one-time-use keys available to satisfy the request, execution advances to block 1208. At block 1208, the signature authority identifies one or more seed values that can be used to delegate an appropriate set of secret keys to the prospective delegate. The one or more seed values are selected so that the children of the one or more seed values represent the number of secret keys requested. For example, if the prospective delegate requests four one-time-use keys, the signature authority will identify a seed value that can be used to generate four previously unused one-time-use keys. For example, in FIG. 10, the seed 1006 may be provided since it may be used to generate the four secret keys 1024, 1026, 1028, and 1030. In some examples, a number of seed values may be provided. If the prospective delegate requests six secret keys, the signature authority may provide a first seed value that can be used to generate two previously unused one-time-use keys, and a second seed value that can be used to generate four previously unused one-time-use keys.

At block 1210, the signature authority identifies a set of intermediate hashes that will allow the prospective delegate to verify signatures generated with the identified seed values. In some implementations, the structure of the seed tree matches the structure of a Merkle tree that is associated with the one-time-use keys. The signature authority identifies the interior nodes of the Merkle tree that correspond to the seed values to be delegated to the prospective delegate. For each identified interior node of the Merkle tree, the signature authority identifies hash nodes between the identified interior node and the root of the Merkle tree that are used to verify digital signatures subordinate to the identified interior node. If more than one seed value is delegated to the prospective delegate, a corresponding number of hash-node sets are identified to allow the prospective delegate to verify digital signatures.

At block 1212, the signature authority provides the seed values to be delegated, the positions of the seed values within the Merkle tree, and the hash-node sets to the prospective delegate. The delegate uses the seed values to generate a set of secret keys and corresponding public key pairs that are usable as one-time-use keys. The one-time-use keys may be used to generate digital signatures, and the digital signatures may be verified using the Merkle tree by confirming the hashes of the public key pairs against the root of the Merkle tree which is owned by the signature authority.

Figure 13:
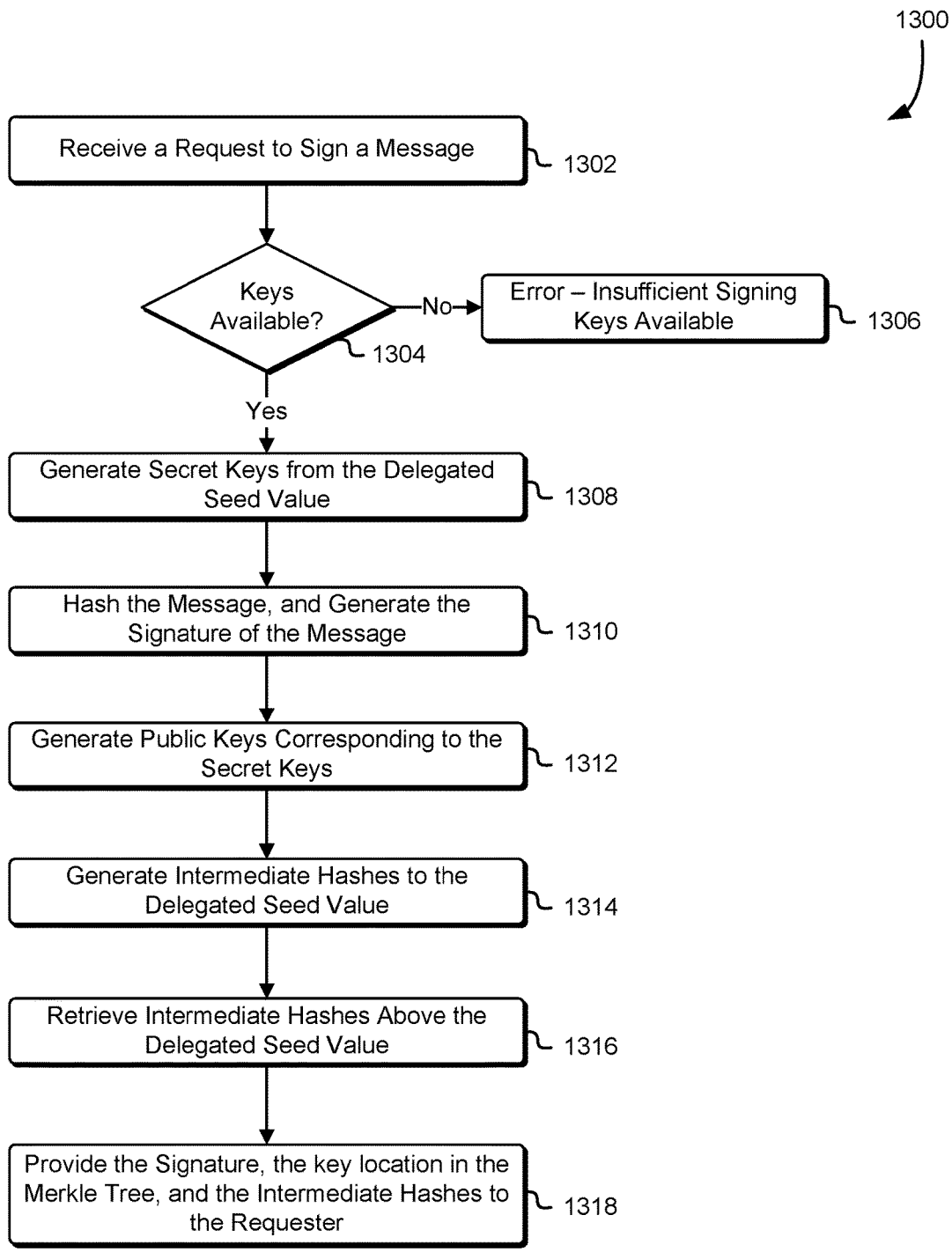
FIG. 13 shows an illustrative example of a process that, as a result of being performed by an authorized entity, signs a message using a one-time-use cryptographic key provided by a signature authority.

FIG. 13 shows an illustrative example of a process that, as a result of being performed by an authorized signature delegate, signs a message using a one-time-use cryptographic key provided by a signature authority. A flowchart 1300 illustrates a process that begins at block 1302 with a delegate receiving a request to sign a message from a requester. The delegate has a set of seed values and supporting information that are usable to generate a set of one-time-use cryptographic keys that are verifiable against the public key owned by the signature authority. The delegate authenticates the requester and confirms that the request is authorized. If the signature request is authorized, execution advances to decision block 1304.

At decision block 1304, the delegate determines whether the delegate has an unused one-time-use cryptographic key with which to generate a digital signature. If the delegate does not have an unused one-time-use cryptographic key, execution advances to block 1306. At block 1306, the delegate generates an error and indicates to the requester that insufficient signing keys are available. In some implementations, the delegate requests additional one-time-use cryptographic keys from the signature authority. In yet another implementation, the delegate identifies a one-time-use cryptographic key from the set of one-time-use cryptographic keys previously allocated to the delegate for reuse. In some implementations, the delegate maintains a first counter of keys allocated by the signature authority, and a second counter of keys used to generate digital signatures in order to identify when unused keys are available. If at least one one-time-use cryptographic key is available, execution advances to block 1308.

At block 1308, the delegate uses the seed values allocated to the delegate by the signature authority to generate a set of secret keys. In some implementations, the delegate generates a complete set of secret keys from the seed values allocated to the delegate and stores the set of secret keys in a data store to be used as needed. The delegate tracks which secret keys have been previously used to generate digital signatures, and selects a particular set of secret keys that have not yet been used to generate the requested digital signature. After selecting the particular set of secret keys, the signature authority determines 1310 a hash value for the message to be signed, and uses the hash value and the generated set of secret keys to generate a signature for the message. In some examples, the signature is generated in accordance with the process shown and described in FIG. 3. After generating the signature, delegate records that the one-time-used key associated with the particular set of secret keys has been used.

At block 1312, the delegate uses the set of secret keys to generate a corresponding set of public keys to be used in verifying the signature. The public keys may be generated by determining a cryptographic hash of each secret key in the set of secret keys as described in FIG. 2. At block 1314, the delegate uses the public keys to generate a set of cryptographic hashes that are arranged in a Merkle tree. The Merkle tree generated by the delegate connects to a parent Merkle tree maintained by the signature authority. At block 1316, the delegate retrieves hash information from the parent Merkle tree from the signature authority that allows the delegate to verify digital signatures generated by the delegate against a root public key owned by the signature authority. In some examples, the signature authority provides the hash values associated with the child nodes of each node in the Merkle tree from the root node to the interior node associated with the each seed value delegated to the delegate.

At block 1318, the delegate assembles the signature and the supporting information to be provided to the requester. The delegate assembles and provides the signature of the message, information that identifies the one-time-use key used to sign the message, the public key of the one-time-use key used to sign the message, and the intermediate hashes necessary to verify the signature against the root hash of the Merkle tree maintained by the signature authority. Using the provided information, the recipient is able to verify that the signature of the message matches the public keys of the one-time-use key, and that the public keys of the one-time-use key are linked to the Merkle tree and to the root of the Merkle tree which is maintained by the signature authority. Therefore, although the signature is generated and provided by the delegate, it can be validated against the signature authority's public key, even though the delegate may not have access to all of the one-time-use keys controlled by the signature authority.

Figure 14:
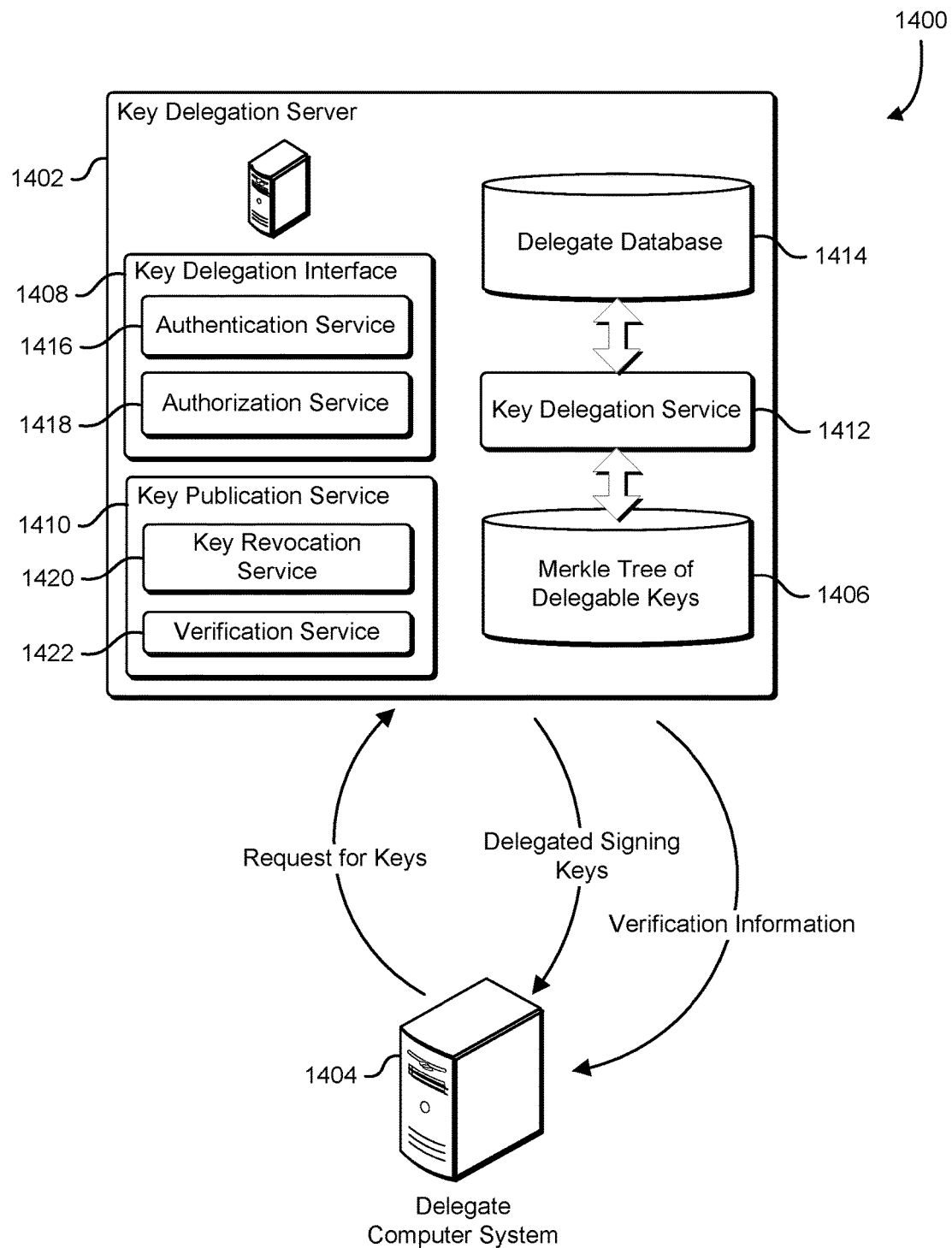
FIG. 14 shows an illustrative example of a delegation service that allocates and distributes blocks of cryptographic keys to one or more authorized delegates.

FIG. 14 shows an illustrative example of a delegation service that allocates and distributes blocks of cryptographic keys to one or more authorized delegates. A system diagram 1400 shows a key delegation server 1402 operated by a signature authority that provides blocks of one-time-use cryptographic keys to a delegate computer system 1404. The key delegation server 1402 is a computer system, computer server or server cluster that includes a processor and memory. The memory contains instructions that implement one or more services.

The key delegation server 1402 maintains a Merkle tree of delegable keys 1406 in a memory on the key delegation server 1402. The delegable keys 1406 are one-time-use cryptographic keys such as Lamport keys or Winternitz keys that are used to generate digital signatures. The key delegation server 1402 includes a key delegation interface 1408, a key publication service 1410, and a key delegation service 1412.

The key delegation interface 1408 is a public interface that allows potential signature delegates to request blocks of one-time-use cryptographic keys from the key delegation server 1402. The key delegation interface 1408 accesses a delegate database 1414 that contains information identifying authorized delegates, and the particular one-time-use cryptographic keys allocated to particular authorized delegates. The key delegation interface 1408 includes an authentication service 1416 and an authorization service 1418. When a delegate contacts the key delegation server 1402, the authentication service 1416 within the key delegation interface 1408 confirms the identity of the delegate using a digital certificate, user-password combination, fingerprint or other biometric. After the delegate has been authenticated, the authorization service 1418 queries the delegate database 1414 and determines whether the delegate is authorized to generate signatures on behalf of the signature authority. The information in the delegate database 1414 may be maintained by an administrator of the signature authority, and may include restrictions on the number of one-time-use keys that may be assigned to a particular delegate.

The key publication service 1410 includes a key revocation service 1420 and a verification service 1422. The key publication service 1410 is used by entities that generate and verify digital signatures. The key publication service 1410 accesses the Merkle tree of delegable keys 1406 and makes available public keys and hashes that allow a particular digital signature generated with a one-time-use key to be verified. For example, when an entity contacts the key publication service 1410 to verify a digital signature, the verification service 1422 within the key publication service 1410 queries the Merkle tree of delegable keys 1406 to acquire the hashes within the Merkle tree that are necessary to confirm the link between the digital signature and the public key of the signature entity.

In some implementations, the key publication service 1410 includes a key revocation service 1420. The key revocation service provides information regarding the revocation of one-time-use cryptographic keys. When verifying a digital signature, the verifying entity contacts the key revocation service 1420 and queries whether the cryptographic key used to generate the digital signature is still valid. The key revocation service 1420 queries the Merkle tree of delegable keys 1406, and if the cryptographic key is marked as invalid, the key revocation service 1420 provides the verifying entity with a revocation value associated with the revoked cryptographic key. The verifying entity confirms the validity of the revocation value by hashing the revocation value and combining the revocation hash with intermediate hashes in the Merkle tree to reproduce the public key of the signature authority. In some examples, the key revocation service 1420 maintains a revocation database that indicates which keys have been revoked. The revocation database may be a relational database, hash table, list. In some implementations, the revocation database is implemented using a blockchain.

The delegate computer system 1404 may contact the key delegation server 1402 to acquire additional blocks of one-time-use cryptographic keys as needed to generate digital signatures. When the delegate computer system 1404 sends a request for keys to the key delegation server 1402, the request is received by the key delegation interface 1408. The key delegation interface authenticates the delegate computer system 1404 and authorizes the request. The request is forwarded to the key delegation service 1412, and the key delegation service 1412 identifies a set of one-time-use cryptographic keys from the Merkle tree of delegable keys 1406. The set of one-time-use cryptographic keys is marked as being allocated to the delegate computer system 1404, and the delegate database 1414 is updated to record the keys that are allocated to the delegate computer system 1404. The key delegation service 1412 returns the requested one-time-use cryptographic keys to the delegate computer system 1404. The key delegation service 1412 provides information to the key publication service 1410 indicating the additional one-time-use cryptographic keys that are been allocated to the delegate computer system 1404. Using information from the delegate database 1414, the verification service 1422 identifies the intermediate hashes necessary to verify digital signatures generated using the additional one-time-use cryptographic keys, and provides the intermediate hashes to the delegate computer system 1404. In some implementations, the key publication service 1410 identifies verification information that has already been provided to the delegate computer system, and provides only the additional verification information not already in the possession of the delegate computer system 1404.

Figure 15:
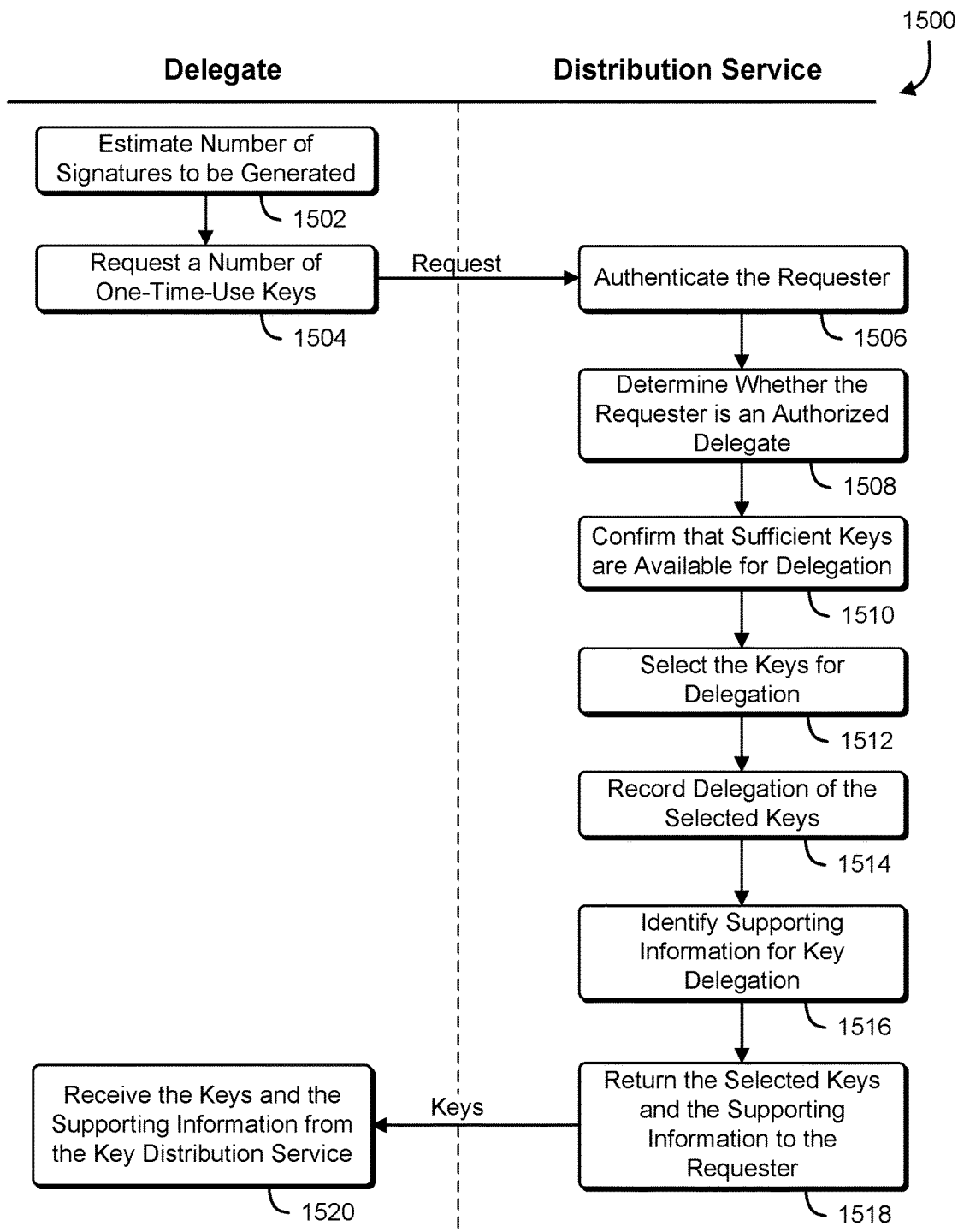
FIG. 15 shows an illustrative example of a process that, as a result of being performed by a key distribution service and a delegate, allocates a block of keys managed by the distribution service to be used by the delegate.

FIG. 15 shows an illustrative example of a process that, as a result of being performed by a key distribution service and a delegate, allocates a block of keys managed by the distribution service to be used by the delegate. A swim diagram 1500 illustrates a process that begins at block 1502 with the delegate estimating a number of digital signatures to be generated on behalf of the signature authority. The number of digital signatures may be estimated based on previous signature generation over a period of time or based on a number of pending messages to be signed. At block 1504, the delegate sends a request specifying the number of one-time-use keys desired to the distribution service.

At block 1506, the distribution service receives the request from the delegate and authenticates the delegate using a digital certificate, a username/password, or other authentication credential. At block 1508, the distribution service determines whether the delegate is authorized to generate digital signatures on behalf of the signature authority by consulting a database of authorized delegate information. If the delegate is authorized to generate digital signatures on behalf of the signature authority, execution advances to block 1510 and the distribution service consults a database of one-time-use cryptographic keys to determine whether there are sufficient unused one-time-use cryptographic keys to satisfy the request. If there are not sufficient unused one-time-use cryptographic keys to satisfy the request, the distribution service responds with an error message to the delegate. Otherwise, the distribution service selects 1512 a set of one-time-use cryptographic keys to be provided to the delegate. The selected set of keys may be chosen from a Merkle tree such that the set of keys descends from a common internal node of the Merkle tree. If there is not a common internal node of the Merkle tree, the selected set of keys may be chosen so that the set of keys comprises a minimum number of internal nodes of the Merkle tree. The selected keys may be provided to the delegate by providing the secret and private key pairs themselves, or by providing seed values associated with the internal nodes of the Merkle tree that are parents of the set of keys as described elsewhere in this document.

At block 1514, the distribution service records that the selected keys have been delegated to the delegate. Delegation of the selected keys may be recorded as a property within the nodes of the Merkle tree or within a database of delegate information maintained by the signature authority. At block 1516, the distribution service identifies supporting information necessary for key verification. The supporting information includes public keys and hash values from the Merkle tree that are used to verify digital signatures created with the set of delegated keys. At block 1518, the distribution service assembles the set of keys and the supporting information, and provides the set of keys and the supporting information to the delegate. In some implementations, the set of keys are provided by providing the secret and public portions of the keys themselves. In other implementations, the set of keys are provided by providing seed values that may be used to generate the secret portions of the keys to be delegated.

At block 1520, the delegate receives the keys and the supporting information from the key distribution service. Using the keys and supporting information, the delegate is able to sign messages with digital signatures, and the digital signatures produced are able to be verified against a public key maintained by the signature authority.

Figure 16:
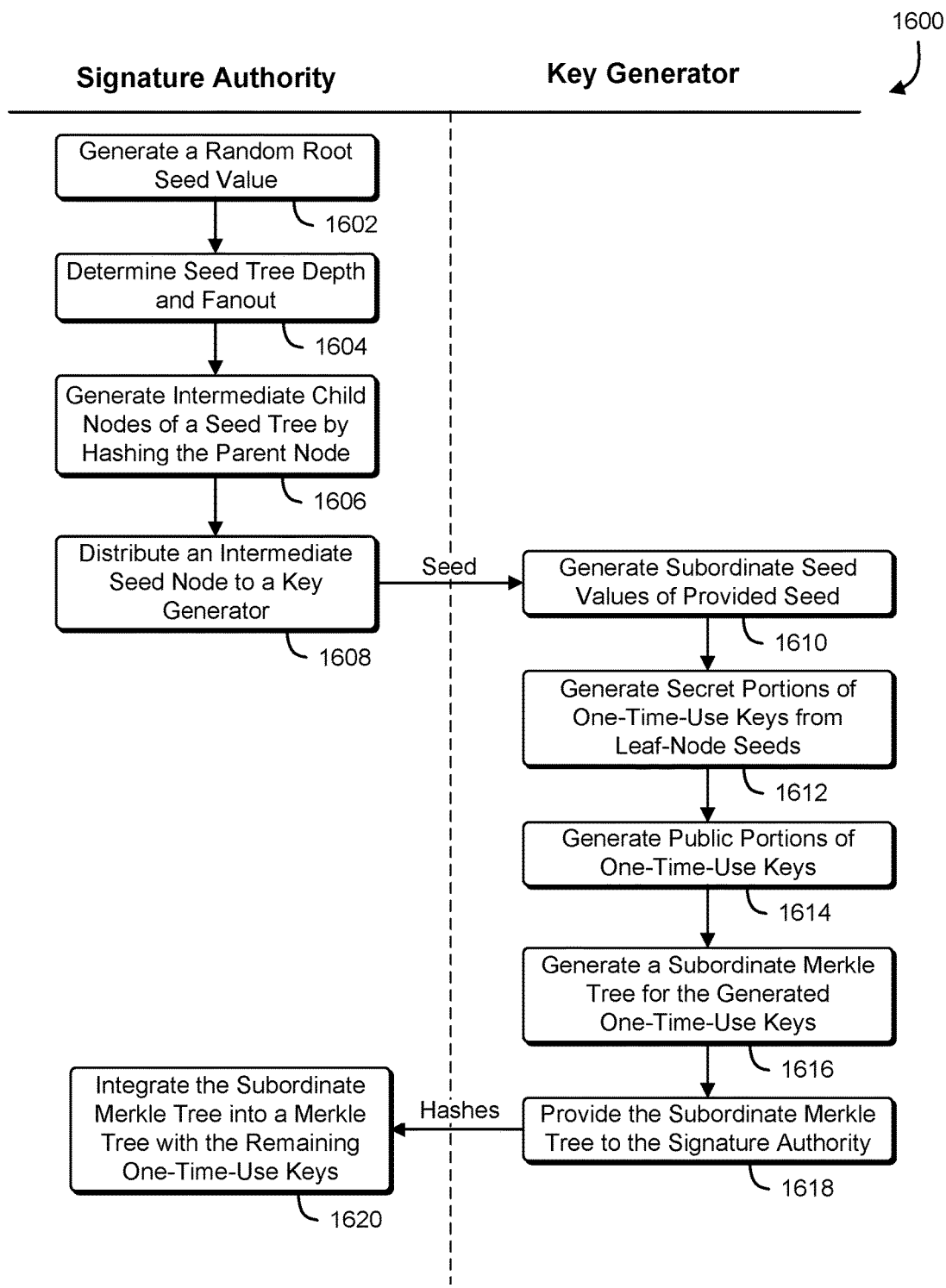
FIG. 16 shows an illustrative example of a process that, as a result of being performed by a signature authority and a delegated key generator, generates a subset of one-time-use keys specified by the signature authority using an intermediate seed value.

FIG. 16 shows an illustrative example of a process that, as a result of being performed by a signature authority and a key generator, generates a subset of one-time-use keys specified by the signature authority using an intermediate seed value. A swim diagram 1600 illustrates a process that begins at block 1602 with a signature authority generating a random seed value to be used in generating a set of one-time-use cryptographic keys. The random seed value may be generated using a hardware random number generator or with pseudorandom number generation techniques. After generating the random root seed value, the signature authority determines 1604 the parameters of a seed tree. The seed tree contains a set of intermediate seed values that are derived from the root seed value. In some examples, the intermediate seed values are derived from the root seed value using a cryptographic hash or other one-way function. The generation of the intermediate seed values is governed by a tree-depth parameter and a fanout parameter. The tree-depth parameter and the fanout parameter are based at least in part on the desired number of one-time-use cryptographic keys to be generated. In one example, the fanout parameter is to and the seed tree is a binary tree, and the depth of the seed tree is selected to provide a number of one-time-use cryptographic keys greater than or equal to the desired number of one-time-use script a graphic keys.

After determining the parameters of the seed tree, the signature authority generates 1606 the intermediate seed values. In some implementations, the intermediate seed values are determined by calculating a cryptographic hash of the value of the parent node plus the position of the child node being generated. For example, the first child node of a particular seed node is determined by calculating the cryptographic hash of the value of the parent node plus one, and the second child node of the particular seed node is determined by calculating the cryptographic hash of the value of the parent node plus two. The signature authority distributes 1608 the intermediate seed values to one or more authorized key generators. The key generators are a service running on a computer system that works in coordination with the signature authority to distribute the generation of one-time-use cryptographic keys. In some examples, the key generators are also able to perform digital signatures on behalf of the signature authority. In other examples, the key generators assist the signature authority by generating a portion of the one-time-use cryptographic keys, and supply a root hash for the portion of one-time-use cryptographic keys that each generator produces. In yet another example, the key generators provide the signature authority with the one-time-use cryptographic keys that are generated in addition to the hash values associated with the generated one-time-use cryptographic keys.

At block 1610, the key generator receives the intermediate seed value from the signature authority. In some examples, the signature authority provides the key generator with parameters of the subset of the seed tree represented by the intermediate seed value. The parameters may include a fanout and depth of the subset of the seed tree to be generated by the key generator. In yet another example, the signature authority specifies a seed generation algorithm and/or a key-generation algorithm to be used in generating the subset of the seed tree. The key generator generates subordinate seed values from the intermediate seed value in accordance with any parameters provided by the signature authority.

At block 1612, the key generator generates secret portions of one-time-use keys from leaf nodes of the subset of the seed tree generated by the key generator. In some examples, the secret portions of the one-time-use keys are generated using a cryptographic hash or one-way function and a key derivation function. The cryptographic hash or one-way function prevents a recipient of the one-time-use key from deriving the seed value used to generate the key, and the key derivation function transforms the resulting pseudorandom number into a format suitable for use as a key. In some examples, the secret portions of the one-time-use keys are a collection of key pairs. At block 1614, the key generator generates public portions of the one-time-use keys from the secret portions of the one-time-use keys. In some examples, the public portions of the one-time-use keys are generated by applying a cryptographic hash to the secret portions of the one-time-use keys. In one implementation, the secret portions of the one-time-use keys are pseudorandom key pairs, and the public portions of the one-time-use keys are corresponding pairs of hashes of each pseudorandom key pair.

At block 1616, the key generator generates a subordinate Merkle tree of the public portions of the one-time-use keys. The public portions of the one-time-use keys are hashed to produce a set of corresponding hashes. The corresponding hashes are used as the leaf nodes of the Merkle tree, and the key generator completes the Merkle tree using a tree geometry that corresponds to the geometry of the subset of the seed tree generated earlier. After generating the Merkle tree, the key generator provides 1618 the root hash of the Merkle tree to the signature authority. In some implementations, the key generator provides the entire Merkle tree. In yet another implementation, the key generator provides the one-time-use keys generated by the key generator in addition to the Merkle tree.

At block 1620, the signature authority receives the hashes from the key generator. The signature authority uses the root hash provided by the key generator to complete a master hash tree of one-time-use keys that are managed by the signature authority. The master hash tree may include additional root hashes generated by other subordinate signature authorities. In some examples, the signature authority combines the hashes provided by the key generator with hashes provided by other key generators to complete a master hash tree for the entire set of one-time-use keys. In this way, the signature authority may distribute the task of generating one-time-use keys amongst a set of trusted key-generating entities resulting in faster key generation.

Figure 17:
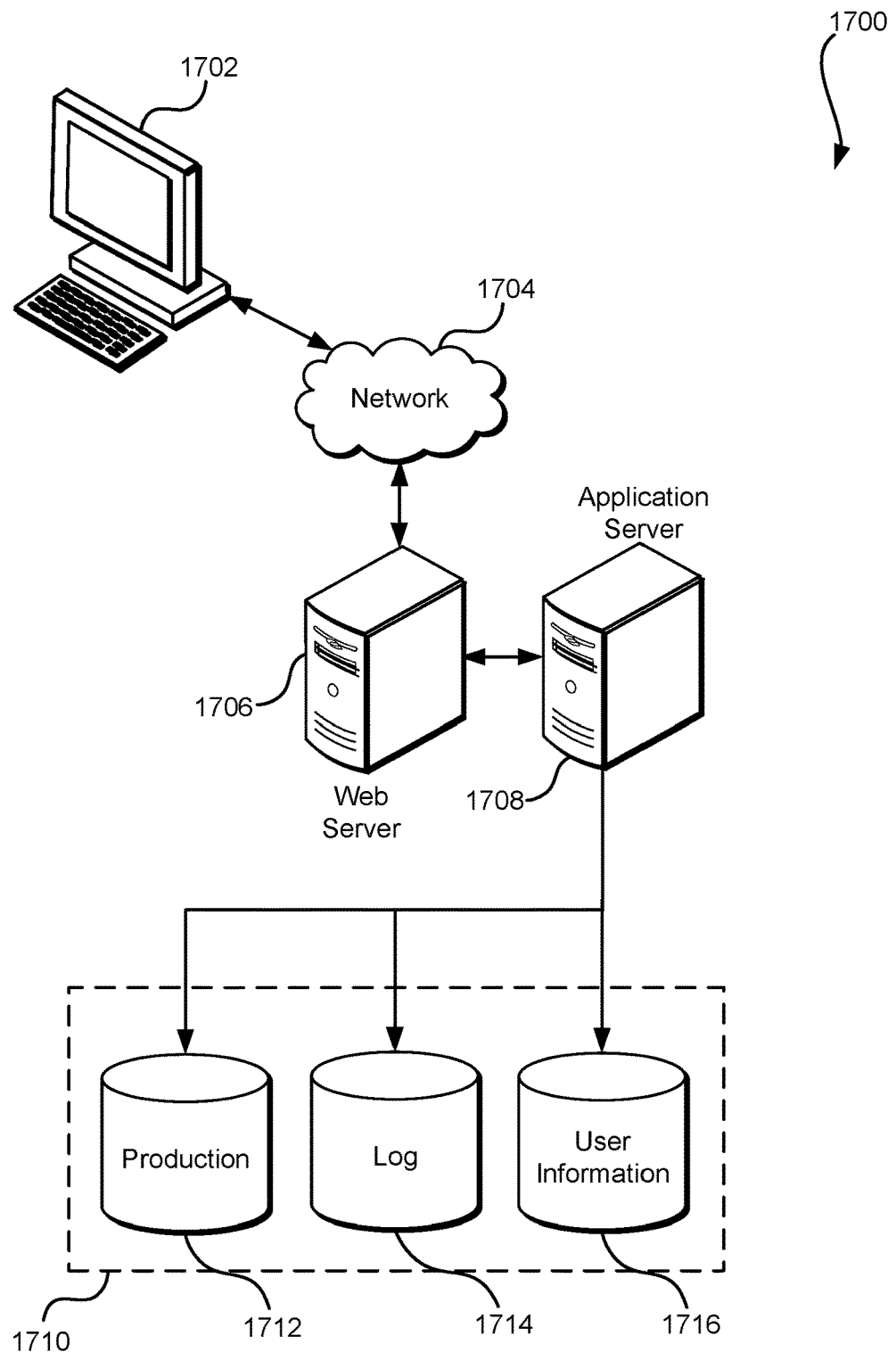
FIG. 17 illustrates an environment in which various embodiments can be implemented.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages, or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1702 and the application server 1708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1710 can include several separate data tables, databases, data documents, dynamic data storage schemes and/or other data storage mechanisms and media for storing data relating to a particular aspect of the present disclosure. For example, the data store illustrated may include mechanisms for storing production data 1712 and user information 1716, which can be used to serve content for the production side. The data store also is shown to include a mechanism for storing log data 1714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update, or otherwise process data in response thereto. The application server 1708 may provide static, dynamic, or a combination of static and dynamic data in response to the received instructions. Dynamic data, such as data used in web logs (blogs), shopping applications, news services, and other such applications, may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA), the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information) may also be used as digital signatures.

It should be noted that the phrase "one-way function" includes functions that are not necessarily one-way in the strict mathematical sense, but that exhibit properties (such as collision resistance, preimage resistance, and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes (e.g., hash based message authentication code (HMAC)), key derivation functions, such as PBKDF2 and bcrypt (with the password being based at least in part on the plaintext and the cryptographic key, e.g.), and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold), and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a key distribution service operating within a distributed computing environment and hosted by a signature authority computer system that has authority over a set of one-time-use keys, the set of one-time-use keys including secret portions and public portions, the public portions of the set of one-time-use keys linked to a Merkle tree having a public key of the signature authority computer system at a root of the Merkle tree, a request for a number of one-time-use keys from a requester;
   providing, from the key distribution service, information to the requester that enables the requester to generate a subset of the set of one-time-use keys; and
   providing, to the requester, from the key distribution service, one or more verification hashes from the Merkle tree that enable the requester to verify a digital signature against the public key at the root of the Merkle tree using the verification hashes, the digital signature generated with a delegated one-time-use cryptographic key selected from the subset of the one-time-use keys.

2. The computer-implemented method of claim 1, further comprising:
   obtaining, at the key distribution service, an additional request from the requester for an additional number of one-time-use keys; and
   providing, to the requester, from the key distribution service, additional information that reveals an additional subset of the set of one-time-use keys.

3. The computer-implemented method of claim 1, further comprising:
   generating a seed tree of one or more subordinate seed values from a master seed value;
   generating the secret portions of the subset of the set of one-time-use keys from seed values at leaf nodes of the seed tree; and
   wherein the information is a seed value of the one or more subordinate seed values.

4. The computer-implemented method of claim 3, further comprising:
   generating the public portions of the subset of the set of one-time-use keys by determining cryptographic hashes of the secret portions of the subset of the set of one-time-use keys; and
   generating one or more of the verification hashes by generating one or more hashes of the public portions of the subset of the set of one-time-use keys.

5. A system, comprising:
at least one computing device that includes a processor and a physical memory storing executable instructions that, as a result of being executed, implement a key distribution service that:
  generates a set of one-time-use cryptographic keys, the set of one-time-use cryptographic keys including secret keys and public keys cryptographically derived from the secret keys;
  generates, from the public keys, a set of key hashes in a hash tree, a root of the hash tree representing a root public key of a signature authority;
  selects a subset of the one-time-use cryptographic keys to be provided to a delegate authorized to sign on behalf of the signature authority;
  provides, to the delegate, information from which secret keys associated with the subset of the one-time-use cryptographic keys are determinable; and
  provides verification values that enable the delegate to derive the root public key from the secret keys.

6. The system of claim 5, wherein the key distribution service:
  records, in a database maintained by the key distribution service, that the subset of the one-time-use cryptographic keys has been assigned to the delegate; and
  confirms that the subset of the one-time-use cryptographic keys has not been assigned to another delegate.

7. The system of claim 5, wherein set of one-time-use cryptographic keys is a set of Lamport signature keys or Winternitz signature keys.

8. The system of claim 5, wherein:
  the delegate submits a request for one-time-use cryptographic keys to the key distribution service via a network service interface; and
  the key distribution service provides the secret keys associated with the subset of the one-time-use cryptographic keys in response to the request.

9. The system of claim 5, wherein:
  the secret keys are randomly generated by the key distribution service; and
  the public keys are cryptographically derived from the secret keys.

10. The system of claim 5, wherein the key distribution service:
  determines a first quantity of one-time-use cryptographic keys requested by the delegate;
  determines a second quantity of one-time-use cryptographic keys in the set of one-time-use cryptographic keys that have not been used to generate a digital signature or provided to a delegate signature authority; and
  determines that the second quantity is greater than or equal to the first quantity as a condition of providing one-time-use cryptographic keys to the delegate.

11. The system of claim 5, wherein the key distribution service:
  generates a master seed value;
  generates a tree of subordinate seed nodes with the master seed value as the root of the tree, and individual subordinate seed nodes of the tree derived from a cryptographic hash of an individual subordinate seed node's parent seed node; and
  generates the secret keys from leaf nodes of the tree.

12. The system of claim 11, wherein the key distribution service:
  identifies a set of subordinate seed nodes from the tree capable of generating the subset of the one-time-use cryptographic keys, and not capable of generating other cryptographic keys in the set of one-time-use cryptographic keys; and
  provides the set of subordinate seed nodes to the delegate.

13. A non-transitory computer-readable storage medium having stored thereon executable instructions that, as a result of being executed by one or more processors of a computer system, cause the computer system to at least:
  generate a set of one-time-use keys that include secret key parts and public key parts, the public key parts of the set of one-time-use keys arranged as leaf nodes of a hash tree, a root node of the hash tree representing a public key of a signature authority;
  obtain a request for a number of one-time-use keys from a delegate signature authority;
  identify a number of unused one-time-use keys from the set of one-time-use keys based on information in a delegate database, the delegate database containing information that identifies one-time-use keys that have been assigned to delegates;
  provide the number of unused one-time-use keys to the delegate signature authority; and
  update the database to indicate that the number of unused one-time-use keys have been assigned to the delegate signature authority.

14. The non-transitory computer-readable storage medium of claim 13, wherein the instructions further comprise instructions that, as a result of being executed by the one or more processors, cause the computer system to generate a one-time-use key by at least:
  generating a secret key part of the one-time-use key from a random number; and
  generating a public key part of the one-time-use key by determining a cryptographic hash of the secret key part.

15. The non-transitory computer-readable storage medium of claim 13, wherein the instructions further comprise instructions that, as a result of being executed by the one or more processors, cause the computer system to:
  obtain, from the authorized delegate, information that identifies a subset of the number of unused one-time-use keys; and
  update the database to indicate that the subset of the number of unused one-time-use keys are no longer assigned to the delegate signature authority.

16. The non-transitory computer-readable storage medium of claim 13, wherein the instructions further comprise instructions that, as a result of being executed by the one or more processors, cause the computer system to:
  identify a set of internal nodes of the hash tree based on the leaf nodes that are associated with the number of unused one-time-use keys, the set of internal nodes having associated hash values that enable the delegate signature authority to re-create the root node of the hash tree from the number of unused one-time-use keys; and
  provide the associated hash values to the delegate signature authority.

17. The non-transitory computer-readable storage medium of claim 13, wherein the instructions further comprise instructions that, as a result of being executed by the one or more processors, cause the computer system to:
  determine that there are not sufficient unused one-time-use keys in the set of one-time-use keys to satisfy the request;
  generate an additional set of one-time-use keys having public key parts arranged as leaf nodes of an additional hash tree; and wherein a new root node of the additional hash tree represents another public key of the signature authority.

18. The non-transitory computer-readable storage medium of claim 13, wherein the instructions further comprise instructions that, as a result of being executed by the one or more processors, cause the computer system to:
- determine that there are not sufficient unused one-time-use keys in the set of one-time-use keys to satisfy the request;
- identify a set of reusable one-time-use keys based on information in a key-use database maintained by the signature authority; and
- provide the set of reusable one-time-use keys to the delegated signature authority.

19. The non-transitory computer-readable storage medium of claim 13, wherein the instructions further comprise instructions that, as a result of being executed by the one or more processors, cause the computer system to:
- obtain, from the delegate signature authority, an indication that a one-time-use key has been used to generate a digital signature;
- record, in a key-use database maintained by the signature authority, that the one-time-use key has been used to generate the digital signature; and
- determine, based at least in part on information in the key-use database, whether the one-time-use key has been used to generate more than one different digital signature.

20. The non-transitory computer-readable storage medium of claim 19, wherein the instructions further comprise instructions that, as a result of being executed by the one or more processors, cause the computer system to, based at least in part on having determined that the one-time-use key has been used to generate more than one different digital signature, revoke the one-time-use key.

* * * * *